US011947328B2

(12) United States Patent
Ota et al.

(10) Patent No.: US 11,947,328 B2
(45) Date of Patent: Apr. 2, 2024

(54) CONTROL DEVICE, CONTROL PROGRAM, AND CONTROL SYSTEM

(71) Applicant: OMRON CORPORATION, Kyoto (JP)

(72) Inventors: Masanori Ota, Otsu (JP); Yoshihide Nishiyama, Yokohama (JP)

(73) Assignee: OMRON CORPORATION, Kyoto (JP)

( * ) Notice: Subject to any disclaimer, the term of this patent is extended or adjusted under 35 U.S.C. 154(b) by 144 days.

(21) Appl. No.: 17/424,763

(22) PCT Filed: Feb. 4, 2020

(86) PCT No.: PCT/JP2020/004106
§ 371 (c)(1),
(2) Date: Jul. 21, 2021

(87) PCT Pub. No.: WO2020/166432
PCT Pub. Date: Aug. 20, 2020

(65) Prior Publication Data
US 2022/0137581 A1 May 5, 2022

(30) Foreign Application Priority Data
Feb. 15, 2019 (JP) ................................. 2019-025704

(51) Int. Cl.
*G05B 19/042* (2006.01)
*G05B 23/02* (2006.01)
(Continued)

(52) U.S. Cl.
CPC ..... *G05B 19/0428* (2013.01); *G05B 19/0423* (2013.01); *G05B 19/0426* (2013.01);
(Continued)

(58) Field of Classification Search
CPC ............. G06F 16/2474; G06F 11/3072; G06F 11/3089; G06F 11/30; G05B 23/02; G05B 23/0205; G05B 23/0208; G05B 23/0216
See application file for complete search history.

(56) References Cited

U.S. PATENT DOCUMENTS

2006/0044955 A1  3/2006 Komori et al.
2011/0295761 A1 12/2011 Sudo et al.
(Continued)

FOREIGN PATENT DOCUMENTS

CN      1738440 A    2/2006
CN    105900092 A    8/2016
(Continued)

OTHER PUBLICATIONS

Written Opinion for PCT/JP2020/004106, dated Mar. 31, 2020.
(Continued)

*Primary Examiner* — William Spieler
(74) *Attorney, Agent, or Firm* — Sughrue Mion, PLLC

(57) ABSTRACT

A control device determines, every control cycle, whether or not process values stored in a time-series manner satisfy a predetermined event condition. When the event condition is satisfied, the control device causes a chapter associated with the satisfied event condition to be stored in correspondence with time information that specifies the control cycle. The control device determines a target section with the time information in correspondence with a chapter that satisfies an extraction condition being defined as the reference, and extracts time-series data of the stored process values included in the determined target section.

13 Claims, 18 Drawing Sheets

(51) Int. Cl.
*G06F 11/30* (2006.01)
*G06F 16/2458* (2019.01)
(52) U.S. Cl.
CPC ..... *G05B 23/0216* (2013.01); *G05B 23/0221* (2013.01); *G06F 11/3072* (2013.01); *G06F 11/3089* (2013.01); *G06F 16/2474* (2019.01)

(56) References Cited

U.S. PATENT DOCUMENTS

2016/0371363 A1 12/2016 Muro et al.
2017/0132291 A1 5/2017 Liu et al.
2018/0239723 A1 8/2018 Ota et al.
2018/0267510 A1 9/2018 Nishiyama et al.

FOREIGN PATENT DOCUMENTS

| EP | 1 296 211 A1 | 3/2003 |
|----|---|---|
| JP | 2003-241830 A | 8/2003 |
| JP | 2004-185077 A | 7/2004 |
| JP | 2010-282246 A | 12/2010 |
| JP | 2011-028654 A | 2/2011 |
| JP | 2012-14686 A | 1/2012 |
| JP | 2013-171348 A | 9/2013 |
| JP | 2017-91113 A | 5/2017 |
| JP | 2018-133037 A | 8/2018 |
| JP | 2018-151917 A | 9/2018 |

OTHER PUBLICATIONS

International Search Report for PCT/JP2020/004106, dated Mar. 31, 2020.
Extended European Search Report dated Oct. 19, 2022 in Application No. EP 20 75 5733.
Japanese Office Action dated Oct. 3, 2023 in Application No. 2019-25704.
Chinese Office Action dated Dec. 7, 2023 in Application No. 202080010024.9.

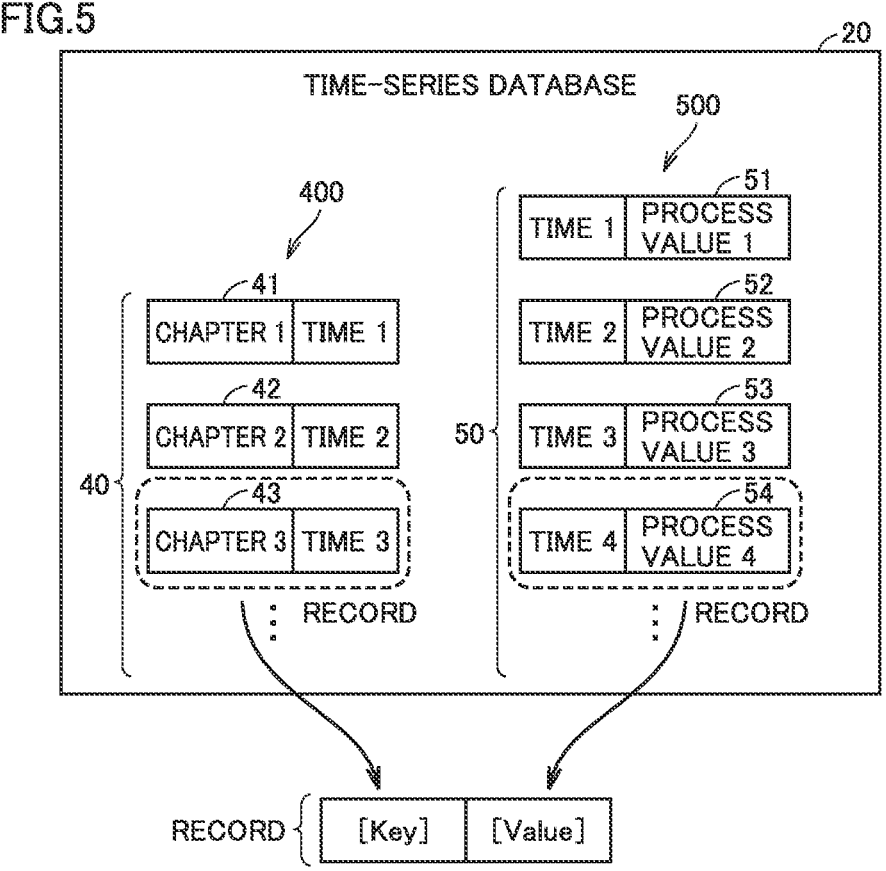

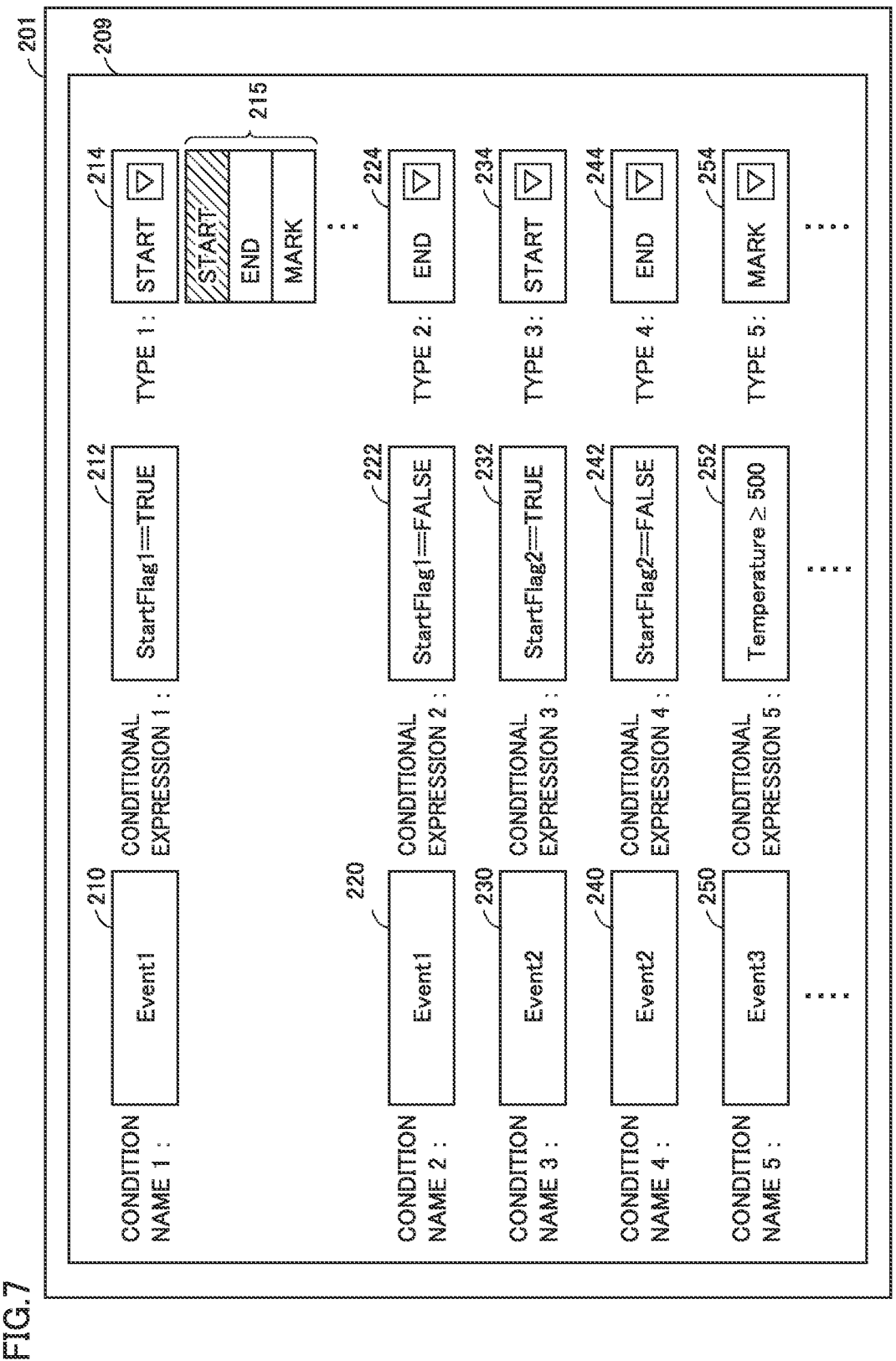

FIG.8

Table 400:

| AutoID | Mark | Type | RECORD Key |
|---|---|---|---|
| | | | Value |
| | Key | | |
| 001 | Event1 | CS | 10:10:10:01 |
| 002 | Event1 | CE | 10:10:10:04 |
| 003 | Event2 | CS | 10:10:10:05 |
| 004 | Event3 | MA | 10:10:10:06 |
| 005 | Event2 | CE | 10:10:10:07 |
| ... | | | |

401 = AutoID, 402 = Mark, 403 = Type, 404 = RECORD Key

Table 500:

| ID | Time Stamp | Index | Data |
|---|---|---|---|
| | Key | | Value |
| 0100 | 10:10:10:00 | 10050 | ... |
| 0101 | 10:10:10:01 | 10051 | ... |
| 0102 | 10:10:10:02 | 10052 | ... |
| 0103 | 10:10:10:03 | 10053 | ... |
| 0104 | 10:10:10:04 | 10054 | ... |
| 0105 | 10:10:10:05 | 10055 | ... |
| 0106 | 10:10:10:06 | 10056 | ... |
| 0107 | 10:10:10:07 | 10057 | ... |
| 0108 | 10:10:10:08 | 10058 | ... |

501 = ID, 502 = Time Stamp, 503 = Index, 50 = Data

CONTROL DEVICE, CONTROL PROGRAM, AND CONTROL SYSTEM

CROSS REFERENCE TO RELATED APPLICATIONS

This application is a National Stage of International Application No. PCT/JP2020/004106 filed Feb. 4, 2020, claiming priority based on Japanese Patent Application No. 2019-025704 filed Feb. 15, 2019, the entire contents of each of which being herein incorporated by reference in their entireties.

TECHNICAL FIELD

The present invention relates to a technology of a control device with a function for storing data in a time-series manner.

BACKGROUND ART

At various production sites, a factory automation (FA) technology using such a control device as a programmable controller (PLC) has widely been used. There are demands for subsequent analysis of data handled by such a control device.

For example, Japanese Patent Laying-Open No. 2018-151917 (PTL 1) describes a control device that obtains input data from an object to be controlled and performs control operation based on the obtained input data to determine output data, the control device causing a time-series database to store at least a part of the input data and the output data and providing to the outside, a dataset including an observation value including at least a part of data such as the input data and the output data and corresponding manufacturing data.

CITATION LIST

Patent Literature

PTL 1: Japanese Patent Laying-Open No. 2018-151917

SUMMARY OF INVENTION

Technical Problem

In general, data collected in a database is used for subsequent analysis. Therefore, even when such a configuration as collecting a large amount of data in a database embedded in the control device as described above is adopted, a scheme that allows efficient subsequent analysis is required.

One of objects of the present invention is to provide a scheme that allows efficient subsequent analysis in a control device incorporating a data collection function for meeting the demands as described above.

Solution to Problem

A control device according to one embodiment of the present invention includes a collecting module configured to cause at least a subset of one or more process values available in the control device to be stored in a time-series manner every predetermined control cycle, a condition monitoring module configured to determine, every control cycle, whether or not one or more predetermined event conditions are satisfied in relation to at least the subset of the one or more process values and to cause, when any event condition is satisfied, a chapter associated with the satisfied event condition to be stored in correspondence with time information that specifies the control cycle, and an extracting module configured to determine, in accordance with an extraction condition defined to include at least one of one or more chapters, a target section with the time information in correspondence with the chapter included in the extraction condition being defined as the reference, and to extract time-series data of the stored process values included in the determined target section.

According to this configuration, the control device can readily extract data for efficient subsequent analysis, by extracting time-series data of process values in accordance with an extraction condition.

The extraction condition may include designation of one or more chapters and designation of a range for specifying a start position and/or an end position of the target section with the time information in correspondence with the one or more chapters being defined as the reference. According to this configuration, the control device can accept change of at least any of the start position and/or the end position of the target section in the extraction condition.

The extraction condition may include a combination of a plurality of the chapters. According to this configuration, by accepting a plurality of extraction condition, the control device can set the process value based on detailed extraction conditions and can extract the process value based on the extraction conditions.

The extraction condition may include a plurality of combinations of the plurality of chapters. According to this configuration, by accepting a plurality of sets of a plurality of extraction conditions, the control device can set further detailed extraction conditions and can extract the process value based on the extraction conditions.

The extraction condition may be defined by logical operation between a plurality of extraction conditions on which determination of the target section is based. According to this configuration, as the extraction condition can be set with the use of logical operation, the control device can arbitrarily set a range of extraction of the process value based on a combination of a plurality of conditions.

A value of the chapter associated with the event condition may be set to any value by a user. According to this configuration, the control device can cause a chapter in accordance with an event condition arbitrarily set by the user to be stored in the time-series database.

An output module configured to provide output in any data format, of the time-series data of the process values extracted by the extracting module may further be included. According to this configuration, the control device can convert extracted data into a data format compatible with an external apparatus.

According to another embodiment of the present invention, a control program executed in a control device configured to control an object to be controlled is provided. The control program causes the control device to perform storing in a time-series manner, every predetermined control cycle, at least a subset of one or more process values available in the control device, determining, every control cycle, whether or not one or more predetermined event conditions are satisfied in relation to at least the subset of the one or more process values and storing, when any event condition is satisfied, a chapter associated with the satisfied event condition in correspondence with time information that specifies the control cycle, and determining, in accordance with an extraction condition defined to include at least one of one or more chapters, a target section with at least the time information in correspondence with the chapter included in the extraction condition being defined as the reference, and extracting time-series data of the stored process values included in the determined target section.

According to this configuration, the control program can extract data for efficient subsequent analysis, by extracting time-series data of process values in accordance with an extraction condition.

A control system according to yet another embodiment of the present invention includes a control device configured to control an object to be controlled and an extracting module configured to extract time-series data of process values. The control device includes a collecting module configured to cause at least a subset of one or more process values available in the control device to be stored in a time-series manner every predetermined control cycle and a condition monitoring module configured to determine, every control cycle, whether or not one or more predetermined event conditions are satisfied in relation to at least the subset of the one or more process values and to cause, when any event condition is satisfied, a chapter associated with the satisfied event condition to be stored in correspondence with time information that specifies the control cycle. The extracting module determines, in accordance with an extraction condition defined to include at least one of one or more chapters, a target section with the time information in correspondence with the chapter included in the extraction condition being defined as the reference, and extracts time-series data of the stored process values included in the determined target section.

According to this configuration, the control system can extract data for efficient subsequent analysis, by extracting time-series data of process values in accordance with an extraction condition.

Advantageous Effects of Invention

According to the present disclosure, a scheme for efficient subsequent analysis in a control device incorporating a data collection function can be provided.

BRIEF DESCRIPTION OF DRAWINGS

FIG. 5 is a schematic diagram of a data structure of a time-series database mounted on the control device according to the present embodiment.

FIG. 7 is a diagram illustrating exemplary setting of an event condition.

FIG. 8 is a diagram illustrating storage of a chapter in the time-series database when an event condition is satisfied.

DESCRIPTION OF EMBODIMENTS

Figure 1:
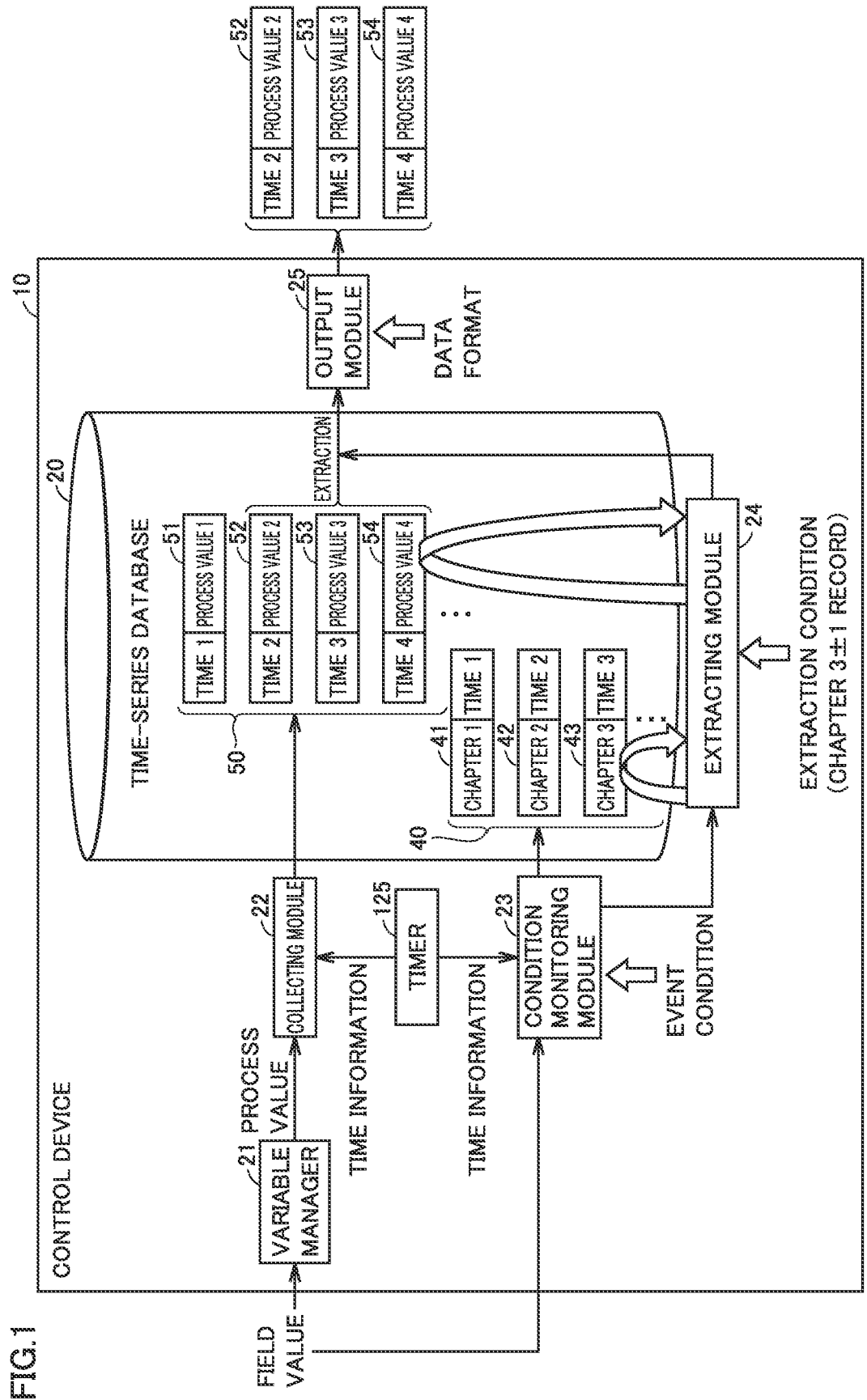
FIG. 1 is a diagram showing an exemplary configuration of a control device according to the present embodiment.

An embodiment of the present invention will be described in detail with reference to the drawings. The same or corresponding elements in the drawings have the same reference characters allotted and description thereof will not be repeated.

<Application>

FIG. 1 is a diagram showing an exemplary configuration of a control device 10 according to the present embodiment. Control device 10 includes a time-series database 20, a variable manager 21, a collecting module 22, a condition monitoring module 23, an extracting module 24, an output unit 25, and a timer 125.

Time-series database 20 is typically arranged in a main storage 106 or a secondary storage 108 (see FIG. 3) which will be described later. A process value written by collecting module 22 and a chapter written by condition monitoring module 23 are stored in time-series database 20 in a time-series manner. Time information that specifies a control cycle in control device 10 is provided to the process value and the chapter stored in time-series database 20. A control cycle is set to a very short period, for example, of the order of several hundred microseconds to several ten milliseconds. Time information is provided by timer 125. Timer 125 is a kind of a counter with a time counting function.

A process value includes a field value exchanged every control cycle between control device 10 and a field apparatus group 8 (see FIG. 2) which will be described later.

When any event condition is satisfied, a chapter is stored in time-series database 20 in correspondence with time information that specifies the control cycle as described above. The chapter refers to data indicating a process value that satisfies the event condition.

The event condition refers to a condition set by an operation by a user with the use of a support apparatus 200 (see FIG. 2) which will be described later. The event condition includes, for example, a value indicating "start" of work processes by field apparatus group 8. The event condition includes, for example, a value indicating "end" of work processes by field apparatus group 8. Furthermore, the event condition includes, for example, a value indicating the fact ("mark") that a temperature of a workpiece (not shown) to be treated is equal to or higher than a predetermined temperature (for example, equal to or higher than 500° C.). The temperature of the workpiece is detected by a temperature sensor (not shown) included in field apparatus group 8. A specific example of processing for storing a chapter in which the event condition is satisfied in time-series database 20 will be described later.

Variable manager 21 manages a value available in control device 10 in a form of a variable. For example, variable manager 21 obtains a field value and manages the field value in a form of a device variable 164 (see FIG. 4) which will be described later. Variable manager 21 manages other values in control device 10 in a form of a system variable 162 and a user variable 166 (see FIG. 4). More specifically, variable manager 21 manages a value indicating a state of control device 10 in a form of system variable 162. Variable manager 21 manages a value held by a user program 152 (see FIG. 4) which will be described later in a form of user variable 166. A field value, a value indicating a state of control device 10, and a value held by user program 152 will collectively be referred to as a "process value" below.

Collecting module 22 causes at least a subset of one or more process values to be stored in time-series database 20 every predetermined control cycle. Time information is provided by timer 125 to one or more stored process values. For example, a plurality of process values including a first process value 51, a second process value 52, a third process value 53, and a fourth process value 54 are stored in time-series database 20. These process values will also collectively be referred to as a process value 50 below.

Condition monitoring module 23 determines, every control cycle, whether or not one or more predetermined event conditions are satisfied in relation to at least the subset of the one or more process values. Time information is provided by timer 125 to one or more stored chapters. For example, a first chapter 41, a second chapter 42, and a third chapter 43 are stored in time-series database 20. These chapters will also collectively be referred to as a chapter 40 below.

When a certain process value 50 satisfies a certain event condition, condition monitoring module 23 causes chapter 40 to be stored in time-series database 20. Time information provided to stored chapter 40 and time information of process value 50 represent identical time and they are in synchronization with each other.

More specifically, for example, when any event condition is satisfied in relation to first process value 51, condition monitoring module 23 causes first chapter 41 to be stored in time-series database 20. First chapter 41 is associated with any event condition and brought in correspondence with time information that specifies the control cycle of first process value 51. Similarly to first chapter 41, condition monitoring module 23 causes second chapter 42 to be stored in time-series database 20 in correspondence with time information that specifies the control cycle of second process value 52. Furthermore, condition monitoring module 23 causes third chapter 43 to be stored in time-series database 20 in correspondence with time information that specifies the control cycle of third process value 53.

Extracting module 24 extracts time-series data of process value 50 that satisfies an extraction condition from time-series database 20. The extraction condition refers to a condition defined to include at least one of one or more chapters 40.

More specifically, extracting module 24 determines a target section for extracting process value 50, with time information in correspondence with chapter 40 included in the extraction condition being defined as the reference. Then, extracting module 24 extracts time-series data of process value 50 included in the determined target section. For example, as shown in FIG. 1, the extraction condition is a condition defined as third chapter 43 and time information in correspondence with third chapter 43 being defined as the reference. The extraction condition is such a condition that a section including process value 50 corresponding to time information in correspondence with third chapter 43 and process values 50 within a range of ± one record with this process value 50 being defined as the reference is set as the target section. Extracting module 24 determines as the target section, a section from second process value 52 to fourth process value 54 including third process value 53, based on the extraction condition. Then, extracting module 24 extracts time-series data of second process value 52 to fourth process value 54 included in the target section. Control device 10 thus readily extracts data for efficient subsequent analysis, by extracting time-series data of process values 50 in accordance with the extraction condition.

Output unit 25 provides time-series data of second process value 52 to fourth process value 54 to an external apparatus connected to control device 10 over a network. The external apparatus includes, for example, a manufacturing execution system (MES) 600 which will be described later and a cloud service 650 (see FIG. 2). Output unit 25 provides time-series data of second process value 52 to fourth process value 54 extracted by extracting module 24 in any data format. The data format includes, for example, at least any of comma separated values (CSV), structure query language (SQL), and a binary format. Control device 10 accepts conversion of the data format from support apparatus 200. Output unit 25 provides second process value 52 to fourth process value 54 to the external apparatus based on the data format accepted from support apparatus 200. As output unit 25 thus determines the data format and exports data, control device 10 can convert extracted data into a data format compatible with an external apparatus.

[A. Configuration of Control System 1]

Figure 2:
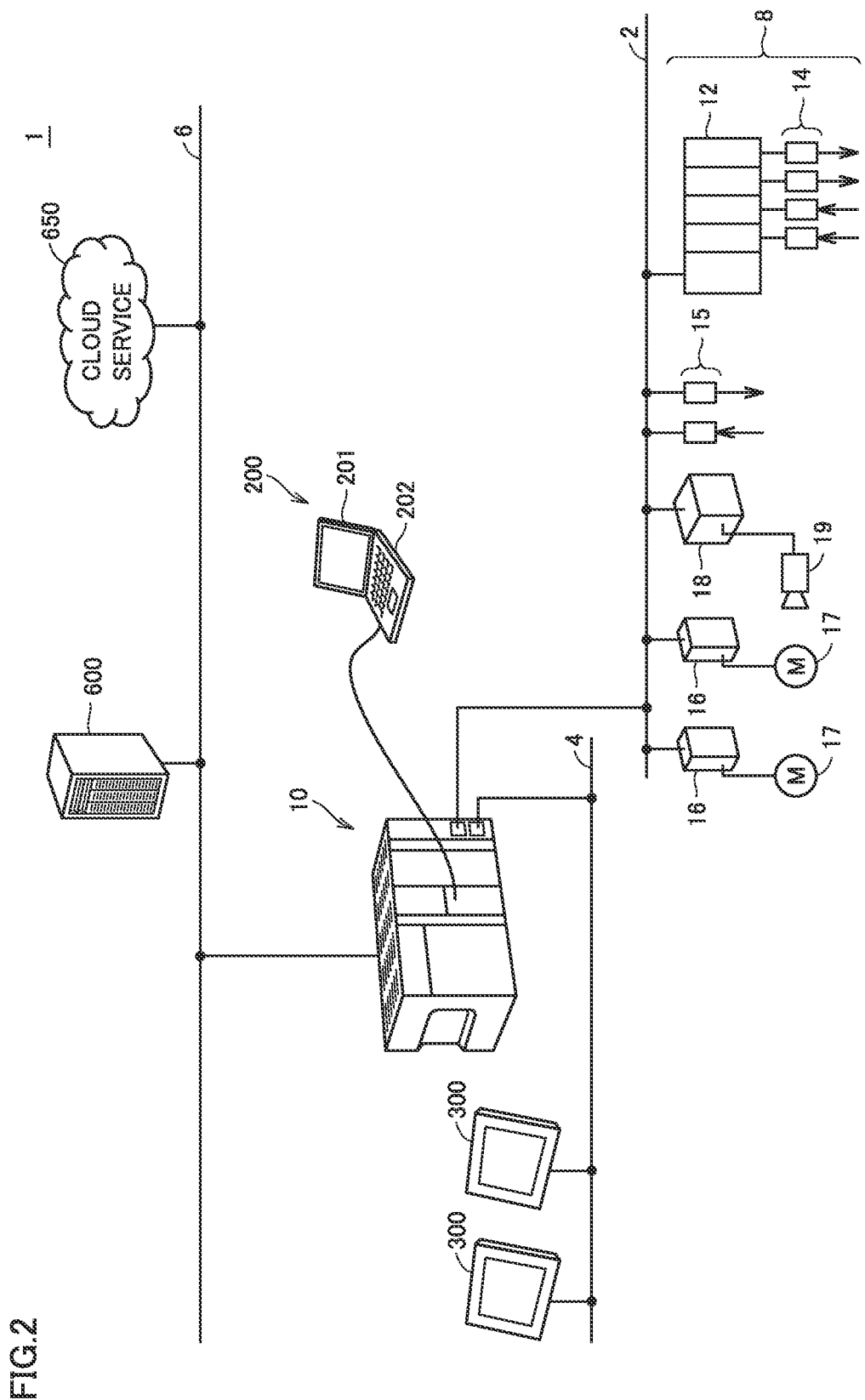
FIG. 2 is a schematic diagram showing an exemplary overall configuration of a control system according to the present embodiment.

FIG. 2 is a schematic diagram showing an exemplary overall configuration of a control system 1 according to the present embodiment. Referring to FIG. 2, control system 1 according to the present embodiment includes, as its main constituent elements, control device 10 that controls an object to be controlled and support apparatus 200 connected to control device 10.

Control device 10 may be implemented by a kind of a computer such as a programmable controller (PLC). Control device 10 is connected to field apparatus group 8 over a first field network 2 and connected to one or more display apparatuses 300 over a second field network 4. Control device 10 exchanges data with a connected apparatus over each network. More specifically, control device 10 exchanges a field value with field apparatus group 8, for example, over first field network 2.

Control device 10 includes a control logic that performs various types of operations for controlling facilities or machines. Control device 10 performs a collection function to collect data (which is also referred to as "input data" below) measured in field apparatus group 8 and transferred to control device 10. Furthermore, control device 10 performs a monitoring function to monitor collected input data as well as an extraction function to extract data and an output function to provide data.

Preferably, a network that establishes cyclic communication in which time of arrival of data is ensured is adopted as first field network 2 and second field network 4. EtherCAT®, EtherNet/IP™, DeviceNet™, and CompoNet™ have been known as such a network that establishes cyclic communication.

Field apparatus group 8 includes an apparatus that collects input data from an object to be controlled and a manufacturing apparatus or a production line (which will also collectively be referred to as a "field" below) relating to control. An input relay and various sensors are assumed as such an apparatus that collects input data. Field apparatus group 8 further includes an apparatus that performs some actions onto a field based on an instruction (which is also referred to as "output data" below) generated by control device 10. An output relay, a contactor, a servo driver and a servo motor, and any other actuators are assumed as an apparatus that performs some actions onto such a field. Field apparatus group 8 exchanges a field value including input data and output data with control device 10 over first field network 2.

In an exemplary configuration shown in FIG. 2, field apparatus group 8 includes a remote input/output (I/O) apparatus 12, a relay group 14, an image sensor 18 and a camera 19, and a servo driver 16 and a servo motor 17.

Remote I/O apparatus 12 includes a communication unit that establishes communication over first field network 2 and an input and output unit (which is also referred to as an "I/O unit" below) for obtaining input data and providing output data. Input data and output data are exchanged between control device 10 and the field with such an I/O unit being interposed. FIG. 2 shows an example in which a digital signal is exchanged as input data and output data with relay group 14 being interposed.

The I/O unit may directly be connected to the field network. FIG. 2 shows an example in which an I/O unit 15 is directly connected to first field network 2.

Image sensor 18 performs image measurement processing such as pattern matching onto data of images picked up by camera 19 and transmits a result of processing to control device 10.

Servo driver 16 drives servo motor 17 in accordance with output data (for example, a position instruction) from control device 10.

As described above, data is exchanged between control device 10 and field apparatus group 8 over first field network 2. Such exchanged data is updated in very short cycles of the order of several hundred microseconds to several ten milliseconds. Processing for updating such exchanged data may also be referred to as "I/O refresh processing." Upon receiving an operation from a user, display apparatus 300 connected to control device 10 over second field network 4 transmits a command in accordance with the operation by the user to control device 10 and graphically shows a result of operation in control device 10.

Manufacturing execution system 600 and cloud service 650 are shown as typical examples of the external apparatus. The external apparatus is connected to control device 10 over a higher-order network 6. Control device 10 transmits process value 50 to such an external system or an external service. Process value 50 provided to the outside includes at least any of a field value, a value of system variable 162, and a value of user variable 166 as described above.

Support apparatus 200 is an apparatus that supports preparation necessary for control device 10 to control an object to be controlled. Support apparatus 200 provides an environment (a program creation and edition tool, a parser, or a compiler) for developing a program to be executed in control device 10. Support apparatus 200 provides a setting environment for setting a parameter (configuration) for control device 10 and various devices connected to control device 10. Furthermore, support apparatus 200 provides a function to transmit generated user program 152 to control device 10 and a function to modify and change on-line, user program 152 executed on control device 10.

Support apparatus 200 includes a display 201 that shows an image and an operation input portion 202 that accepts an operation by a user. Operation input portion 202 includes, for example, at least any of a keyboard and a mouse. Support apparatus 200 accepts an operation by the user through operation input portion 202 and provides a function to set at least any of an event condition and an extraction condition for control device 10.

[B. Exemplary Hardware Configuration of Control Device 10]

An exemplary hardware configuration of control device 10 included in control system 1 according to the present embodiment will now be described.

Figure 3:
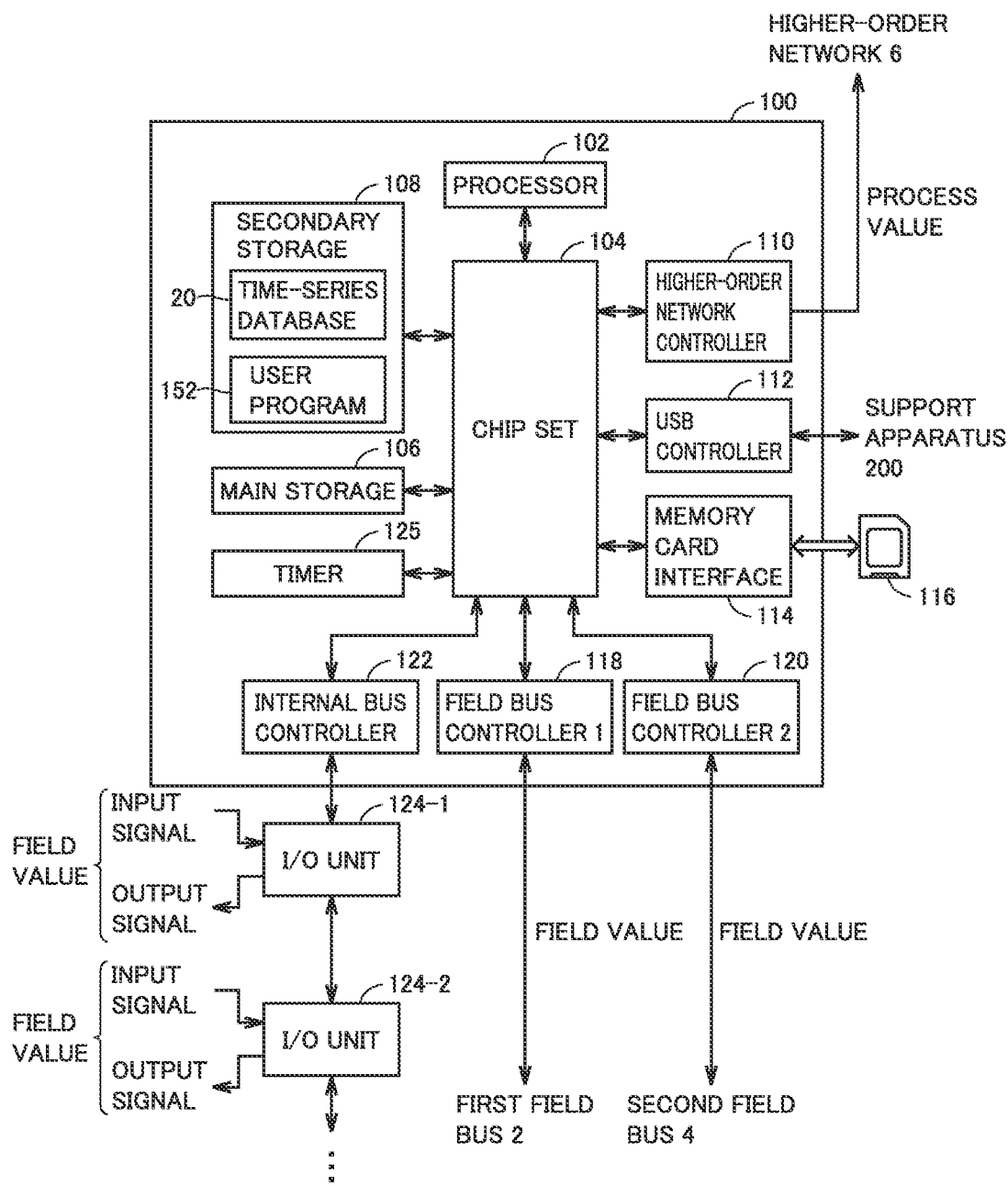
FIG. 3 is a block diagram showing an exemplary hardware configuration of the control device included in the control system according to the present embodiment.

FIG. 3 is a block diagram showing an exemplary hardware configuration of control device 10 included in control system 1 according to the present embodiment. Referring to FIG. 3, control device 10 includes a computing processing unit and one or more I/O units 124-1, 124-2, . . . . In the description below, the computing processing unit is also referred to as a "CPU unit 100."

CPU unit 100 includes a processor 102, a chip set 104, main storage 106, and secondary storage 108. CPU unit 100 includes a higher-order network controller 110, a universal serial bus (USB) controller 112, and a memory card interface 114. CPU unit 100 further includes an internal bus controller 122, field bus controllers 118 and 120, and timer 125.

Processor 102 is configured with a central processing unit (CPU) or a micro-processing unit (MPU), and reads various programs stored in secondary storage 108, develops the programs on main storage 106, and executes the programs. By developing various programs on main storage 106, processor 102 carries out control in accordance with an object to be controlled and various types of processing. By controlling processor 102 and each device, chip set 104 performs processing as control device 10 as a whole.

In addition to a system program for implementing a PLC engine 150 (see FIG. 4) which will be described later, user program 152 executed by using PLC engine 150 is stored in secondary storage 108. Time-series database 20 is further stored in secondary storage 108.

Higher-order network controller 110 controls exchange of data with another apparatus over the higher-order network. More specifically, for example, higher-order network controller 110 transmits a process value to an external apparatus.

USB controller 112 controls exchange of data with support apparatus 200 through USB connection.

Memory card interface 114 is constructed such that a memory card 116 can be attached thereto and detached therefrom, and allows writing of data into memory card 116 and reading of various types of data (user program 152 or trace data) from memory card 116.

Internal bus controller 122 is an interface for exchange of data with I/O units 124-1, 124-2, . . . mounted on control device 10.

Field bus controller 118 controls exchange of a field value with another apparatus over first field network 2. Similarly, field bus controller 120 controls exchange of a field value with another apparatus over second field network 4.

Though FIG. 3 shows an exemplary configuration in which a necessary function is provided by execution of a program by processor 102, a part or the entirety of these provided functions may be performed by using dedicated hardware circuitry (for example, an application specific integrated circuit (ASIC) or a field-programmable gate array (FPGA)). Alternatively, a principal part of control device 10 may be implemented by hardware (for example, an industrial personal computer based on a general-purpose personal computer) in accordance with a general-purpose architecture. In this case, using virtualization technology, a plurality of operating systems (OSs) different in application are executed in parallel and a necessary application may be executed on each OS.

[C. Exemplary Software Configuration of Control Device 10]

An exemplary software configuration of control device 10 included in control system 1 according to the present embodiment will now be described.

Figure 4:
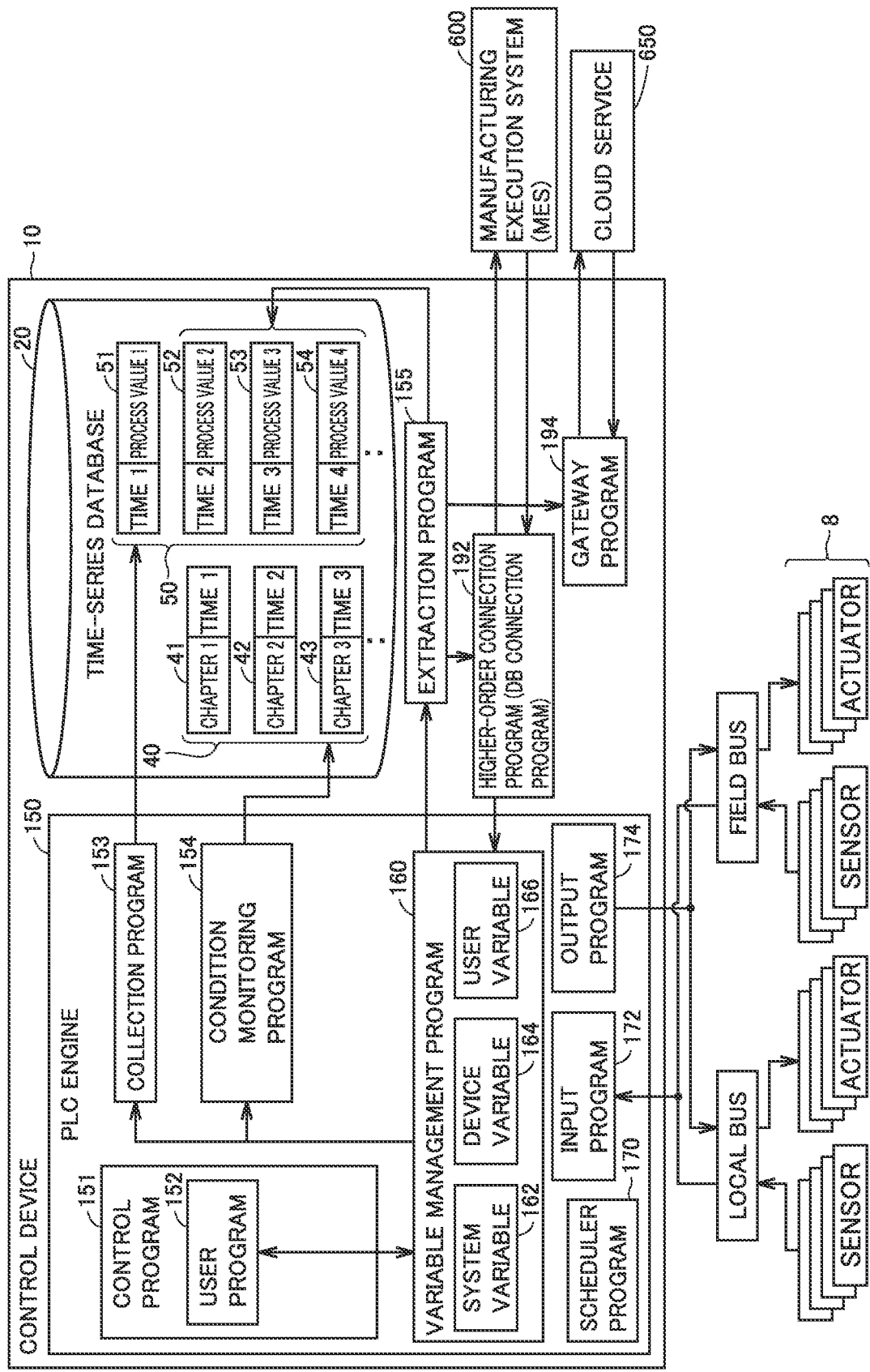
FIG. 4 is a block diagram showing an exemplary software configuration of the control device included in the control system according to the present embodiment.

FIG. 4 is a block diagram showing an exemplary software configuration of control device 10 included in control system 1 according to the present embodiment. Referring to FIG. 4, control device 10 includes PLC engine 150, time-series database 20, an extraction program 155, a higher-order connection program 192, and a gateway program 194.

Typically, an environment for executing various programs is provided in such a manner that processor 102 of control device 10 reads a system program stored in secondary storage 108, develops the system program on main storage 106, and executes the system program. PLC engine 150 can execute various programs in such an execution environment.

More specifically, PLC engine 150 includes a control program 151, a collection program 153, a condition monitoring program 154, a variable management program 160, a scheduler program 170, an input program 172, and an output program 174.

Variable management program 160, scheduler program 170, input program 172, and output program 174 may be mounted as a part of the system program. In this case, a single system program may provide these functions provided by these programs.

Control program 151 typically includes user program 152. User program 152 corresponds to a main part that provides a control operation function, and can arbitrarily be configured depending on a manufacturing apparatus or facility to be controlled by control device 10. User program 152 can be defined, for example, by a ladder logic using a functional block.

Collection program 153 is invoked by an instruction defined in user program 152, based on the control cycle of control device 10. Collection program 153 causes at least a subset of one or more process values 50 to be stored in time-series database 20 every control cycle.

Condition monitoring program 154 is invoked by an instruction defined in user program 152 based on the control cycle of control device 10. Condition monitoring program 154 determines, every control cycle, whether or not one or more predetermined event conditions are satisfied in relation to at least the subset of one or more process values 50. When any event condition is satisfied, condition monitoring module 154 causes chapter 40 associated with the satisfied event to be stored in correspondence with time information that specifies the control cycle.

Variable management program 160 manages in a form of a variable, a value that can be used in PLC engine 150. More specifically, variable management program 160 manages system variable 162 indicating a state of control device 10, device variable 164 indicating a value held by various devices, and user variable 166 indicating a value held by user program 152. Various devices are, for example, devices connected to control device 10 through a local bus or a field bus.

Scheduler program 170 manages allocation of resources to a process or a task performed in control device 10 or timing of performing the same.

Input program 172 provides a function to obtain input data from various devices connected to control device 10 through the local bus or the field bus.

Output program 174 provides an instruction value (output data) calculated by user program 152 executed in control device 10 to a device of interest connected through the local bus or the field bus.

Time-series database 20 is typically arranged in main storage 106 or secondary storage 108, and performs a function to store data and a retrieval function that gives designated data in response to an external request (query). Process value 50 written by collection program 153 is stored in time-series database 20. Chapter 40 written by condition monitoring program 154 is stored in time-series database 20.

Extraction program 155 determines a target section with time information in correspondence with chapter 40 satisfying the extraction condition being defined as the reference, and extracts one or more process values 50 included in the target section.

Higher-order connection program 192 exchanges process value 50 with an external apparatus connected to higher-order network 6 such as manufacturing execution system 600. Higher-order connection program 192 provides process value 50 extracted by extraction program 155 to manufacturing execution system 600 in any data format. Manufacturing execution system 600 includes a database. Alternatively, when a database is arranged separately from manufacturing execution system 600, manufacturing execution system 600 may be provided with a database connection program instead of higher-order connection program 192 or as a part of higher-order connection program 192. Such a database connection program may perform, for example, processing for transmitting a query such as SQL to a relational database and receives a response therefrom.

Gateway program 194 provides time-series data to cloud service 650. Specifically, gateway program 194 obtains from time-series database 20, data of a designated type in designated cycles, and provides the data as time-series data. Gateway program 194 provides process value 50 extracted by extraction program 155 to cloud service 650 in any data format. Process value 50 is stored in a database provided in cloud service 650.

Input program 172 of control device 10 obtains input data from a sensor through the local bus and/or the field bus.

Output program 174 provides output data calculated by control operation by user program 152 as a control output to an actuator through the local bus and/or the field bus.

[D. Data Structure]

An exemplary data structure for implementing time-series database 20 will now be described.

(d1: Time-Series Database 20)

FIG. 5 is a schematic diagram of a data structure of time-series database 20 mounted on control device 10 according to the present embodiment. Referring to FIG. 5, a concept of time-series data handled by time-series database 20 is also referred to as "TimeSeries". One time series may be configured with databases in a plurality of levels. In the present embodiment, the databases in the plurality of levels include a process value database 500 configured with time-series process values 50 stored in time-series database 20 and a chapter database 400 configured with chapters 40.

Time-series database 20 can generate a plurality of time series and may generate, for example, time-series for each application. Each database file may have a unique attribute such as a version.

Time-series data of process values 50 is stored in process value database 500. Process value 50 includes time information corresponding to the control cycle. Time-series data of chapters 40 is stored in chapter database 400. Time information or the like for specifying the control cycle of process value 50 is stored in chapter 40.

Process value 50 is stored in process value database 500 in a unit of a record which represents a minimum unit of data. For example, Key-Value store is adopted for each record in process value database 500. When the Key-Value store record is adopted, data (Value) to be stored and a unique label (Key) corresponding to the data are stored in association with each other. In other words, each record includes Key-Value store Key and Value.

In chapter database 400, chapter 40 is stored in a unit of a record representing a minimum unit of data. For example, Key-Value store is adopted for each record in chapter database 400.

Figure 6A:
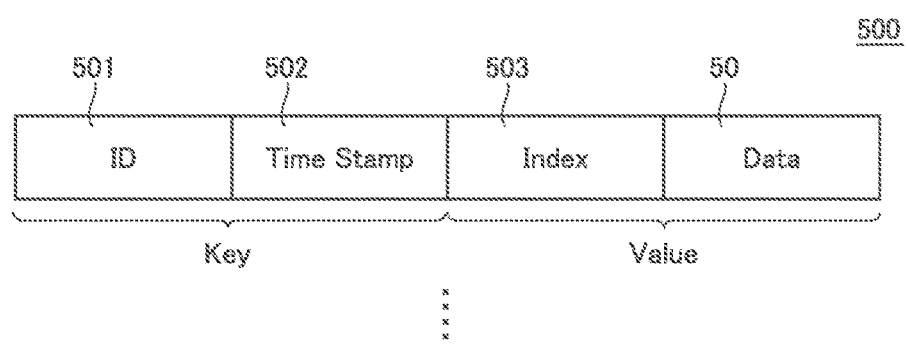
FIGS. 6A and 6B are schematic diagrams of a data structure of a record in a process value database and a chapter database stored in the control device according to the present embodiment.
Figure 6B:
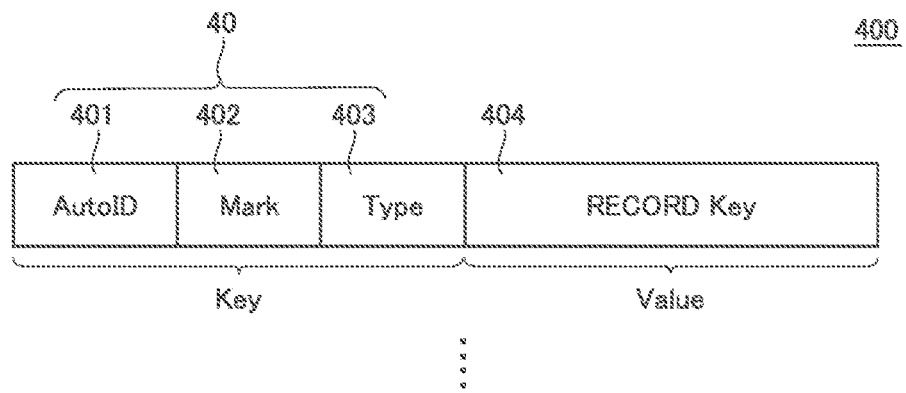

An exemplary more detailed data structure in each record included in process value database 500 and chapter database 400 in FIG. 5 will now be described. FIGS. 6A and 6B are schematic diagrams of a data structure of a record in process value database 500 and chapter database 400 stored in control device 10 according to the present embodiment.

(d2: Process Value Database 500)

Referring to FIG. 6A, a record in process value database 500 is such data that a label (Key) including information specifying timing or time and data (Value) including a corresponding process value are in correspondence with each other. A record in process value database 500 includes an ID 501 and a time stamp 502 as Key. Any identification information associated with data to be stored may be employed as ID 501. Time stamp 502 corresponds to information that specifies time or timing, and for example, time information or counter information managed by CPU unit 100 in storing any process value 50 is used therefor. Key in process value 50 shown in FIG. 6A is by way of example, and Key may include at least one of ID 501 and time stamp 502. Key may include a component other than ID 501 and time stamp 502.

A record in process value database 500 includes an index 503 and process value 50 as Value. Index 503 has a value incremented or decremented by a prescribed value in response to an operation to store data. Typically, a value counted up one by one each time one record is stored is used. Collection program 153 is invoked by an instruction defined in user program 152, and a record including process value 50 designated in collection program 153 is successively written in the time-series database.

(d3: Chapter Database 400)

Referring to FIG. 6B, a record in chapter database 400 includes an AutoID 401, an identifier 402, and an information type 403 as Key. In the present embodiment, AutoID 401, identifier 402, and information type 403 correspond to chapter 40. Key in chapter 40 shown in FIG. 6B is by way of example, and may include at least one of AutoID 401, identifier 402, and information type 403. Chapter 40 may include a component other than AutoID 401, identifier 402, and information type 403 as Key.

AutoID 401 corresponds to identification information successively updated under a predetermined rule, and a value incremented or decremented by a prescribed value in response to registration of a record is used as the AutoID. Typically, a value counted up one by one each time one record is stored is used.

Identifier 402 corresponds to identification information for specifying chapter 40, and any value used for searching for chapter 40 is used therefor. For example, a character string, a numeric value, information on date, or time information may be used as identifier 402. A value stored as identifier 402 may be defined by user program 152.

Information type 403 corresponds to information indicating a type of chapter 40. More specifically, information type 403 serves as an indicator for determining whether or not chapter 40 of interest satisfies an event condition. For example, information type 403 includes a value (for example, "CS") indicating "start" in a work process. For example, information type 403 includes a value (for example, "CE") indicating "end" of the work process. Information type 403 includes a value (for example, "MA") indicating that a temperature of a workpiece is equal to or higher than a predetermined threshold value (for example, 500° C.). These values are by way of example, and another value may be adopted. A value of chapter 40 (a value of information type 403) is thus set to any value by a user. A value of chapter 40 is associated with an event condition, and as will be described later, the event condition can also be set by the user. The value of chapter 40 and the event condition are set, for example, by using support apparatus 200. Control device 10 can thus cause chapter 40 in accordance with an event condition arbitrarily set by a user to be stored in time-series database 20.

A record in chapter database 400 includes as Value, a Key 404 of a record in the process value database (which is also referred to as a "record Key 404" below). A value of record Key 404 is a value corresponding to time stamp 502 in process value database 500. Record Key 404 is used as a search key for searching for and extracting a record including process value 50 of interest from a plurality of records included in process value database 500.

[E. Setting of Event Condition]

Exemplary setting of an event condition will now specifically be described.

FIG. 7 is a diagram illustrating exemplary setting of an event condition. Referring to FIG. 7, display 201 of support apparatus 200 shows an event condition setting image 209. Support apparatus 200 accepts setting of an event condition by an operation onto operation input portion 202 by a user. By way of example, five conditions (a first condition to a fifth condition) are shown in event condition setting image 209. Each condition includes a condition name, a conditional expression, and a type. The condition name is information for determining a value of identifier 402 of chapter 40 brought in correspondence with time information identical to time information in process value 50. Process value 50 is process value 50 that satisfies a set condition for a conditional expression which will be described later. The condition name is, for example, information on which identification of a work process can be based. The conditional expression is a determination expression for determining whether or not process value 50 satisfies a set condition. The type refers to information for detecting a value of information type 403 of chapter 40 in correspondence with time information identical to time information in process value 50. Process value 50 is process value 50 that satisfies a set condition.

In FIG. 7, for example, for the first condition, "Event1" is entered in a first condition name 210, "StartFlag1==TRUE" is entered in a first conditional expression 212, and "start" is entered in a first type 214. In first type 214, any of a plurality of values shown in a type selection field 215 is selected to enter the value of first type 214. Processor 102 executes condition monitoring program 154. When process value 50 that satisfies a condition (for example, "start" in a first work process) in first conditional expression 212 is stored, processor 102 determines that the event condition (the first condition) is satisfied. Processor 102 causes chapter 40 shown in FIG. 8 which will be described later to be stored in time-series database 20. Time information identical in time to process value 50 is brought in correspondence with chapter 40, a value "Event1" is registered in identifier 402, and a value "CS" is registered in information type 403.

For a second condition, "Event1" is entered in a second condition name 220, "StartFlag1==FALSE" is entered in a second conditional expression 222, and "end" is entered in a second type 224. Processor 102 executes condition monitoring program 154. When process value 50 that satisfies a condition (for example, "end" in the first work process) in second conditional expression 222 is stored, processor 102 determines that the event condition (second condition) is satisfied. Processor 102 causes chapter 40 shown in FIG. 8 which will be described later to be stored in time-series database 20. Time information identical in time to process value 50 is brought in correspondence with chapter 40, the value "Event1" is registered in identifier 402, and a value "CE" is registered in information type 403.

For a third condition, "Event2" is entered in a third condition name 230, "StartFlag2==TRUE" is entered in a third conditional expression 232, and "start" is entered in a third type 234. Processor 102 executes condition monitoring program 154. When process value 50 that satisfies a condition (for example, "start" in a second work process) in third conditional expression 232 is stored, processor 102 determines that the event condition (third condition) is satisfied. Processor 102 causes chapter 40 shown in FIG. 8 which will be described later to be stored in time-series database 20. Time information identical in time to process value 50 is brought in correspondence with chapter 40, a value "Event2" is registered in identifier 402, and the value "CS" is registered in information type 403.

For a fourth condition, "Event2" is entered in a fourth condition name 240, "StartFlag2==FALSE" is entered in a fourth conditional expression 242, and "end" is entered in a fourth type 244. Processor 102 executes condition monitoring program 154. When process value 50 that satisfies a condition (for example, "end" in the second work process) in fourth conditional expression 242 is stored, processor 102 determines that the event condition (fourth condition) is satisfied. Processor 102 causes chapter 40 shown in FIG. 8 which will be described later to be stored in time-series database 20. Time information identical in time to process value 50 is brought in correspondence with chapter 40, the value "Event2" is registered in identifier 402, and the value "CE" is registered in information type 403.

For a fifth condition, "Event3" is entered in a fifth condition name 250, "Temperature 500" is entered in a fifth conditional expression 252, and "mark" is entered in a fifth type 254. Processor 102 executes condition monitoring program 154. When process value 50 that satisfies a condition (for example, "start" in a third work process) in fifth conditional expression 252 is stored, processor 102 determines that the event condition (fifth condition) is satisfied. Processor 102 causes chapter 40 shown in FIG. 8 which will be described later to be stored in time-series database 20. Time information identical in time to process value 50 is brought in correspondence with chapter 40, a value "Event3" is registered in identifier 402, and a value "MA" is registered in information type 403.

[F. Storage of Chapter 40 when Event Condition is Satisfied]

FIG. 8 is a diagram illustrating storage of chapter 40 in time-series database 20 when an event condition is satisfied. Referring to FIG. 8, when the event condition in the first condition is satisfied based on condition monitoring program 154, processor 102 causes chapter 40 to be stored in correspondence with time information. More specifically, processor 102 causes a chapter in chapter database 400 including AutoID 401 having a value "001" to be stored in correspondence with time information "10:10:10:01" as a value of record Key 404. Chapter 40 includes identifier 402 having the value "Event1" and information type 403 having the value "CS". The value "CS" is a value that means "start" of the work process as described above. The time information corresponds to a value ("10:10:10:01") of time stamp 502 of ID 501 having a value "0101" in process value database 500.

Processor 102 causes chapter 40 in chapter database 400 including AutoID 402 having a value "002" to be stored in correspondence with time information "10:10:10:04" as a value of record Key 404. Chapter 40 includes identifier 402 having the value "Event1" and information type 403 having the value "CE". The value "CS" is a value that means "end" of the work process as described above. The time information corresponds to a value ("10:10:10:04") of time stamp 502 of ID 501 having a value "0104" in process value database 500.

Processor 102 causes chapter 40 in chapter database 400 including AutoID 402 having a value "003" to be stored in correspondence with time information "10:10:10:05" as a value of record Key 404. Chapter 40 includes identifier 402 having the value "Event2" and information type 403 having the value "CS". The time information corresponds to a value ("10:10:10:05") of time stamp 502 of ID 501 having a value "0106" in process value database 500.

Processor 102 causes chapter 40 in chapter database 400 including AutoID 402 having a value "004" to be stored in correspondence with time information "10:10:10:06" as a value of record Key 404. Chapter 40 includes identifier 402 having the value "Event3" and information type 403 having the value "MA". The value "MA" is a value meaning that the temperature of a workpiece is equal to or higher than a threshold value as described above. The time information corresponds to a value ("10:10:10:06") of time stamp 502 of ID 501 having a value "106" in process value database 500.

Processor 102 causes chapter 40 in chapter database 400 including AutoID 402 having a value "005" to be stored in correspondence with time information "10:10:10:07" as a value of record Key 404. Chapter 40 includes identifier 402 having the value "Event2" and information type 403 having the value "CE". The time information corresponds to a value ("10:10:10:07") of time stamp 502 of ID 501 having a value "107" in process value database 500.

Process value database 500 includes also process values 50 other than process values 50 including time information corresponding to chapters 40 described above. Process value database 500 includes, for example, process values 50 including ID 501 having values "0100", "0102", "0103", and "0108".

[G. Setting of Extraction Condition (Start to End in Work Process 1)]

Exemplary setting of an extraction condition will now be described. The extraction condition is a condition for extracting one or more process values 50 that satisfy a condition from a plurality of process values 50 stored in time-series database 20. Since such process value 50 can be extracted after chapter 40 is stored in time-series database 20 as a result of the event condition being satisfied, subsequent analysis can be efficient.

Figure 9:
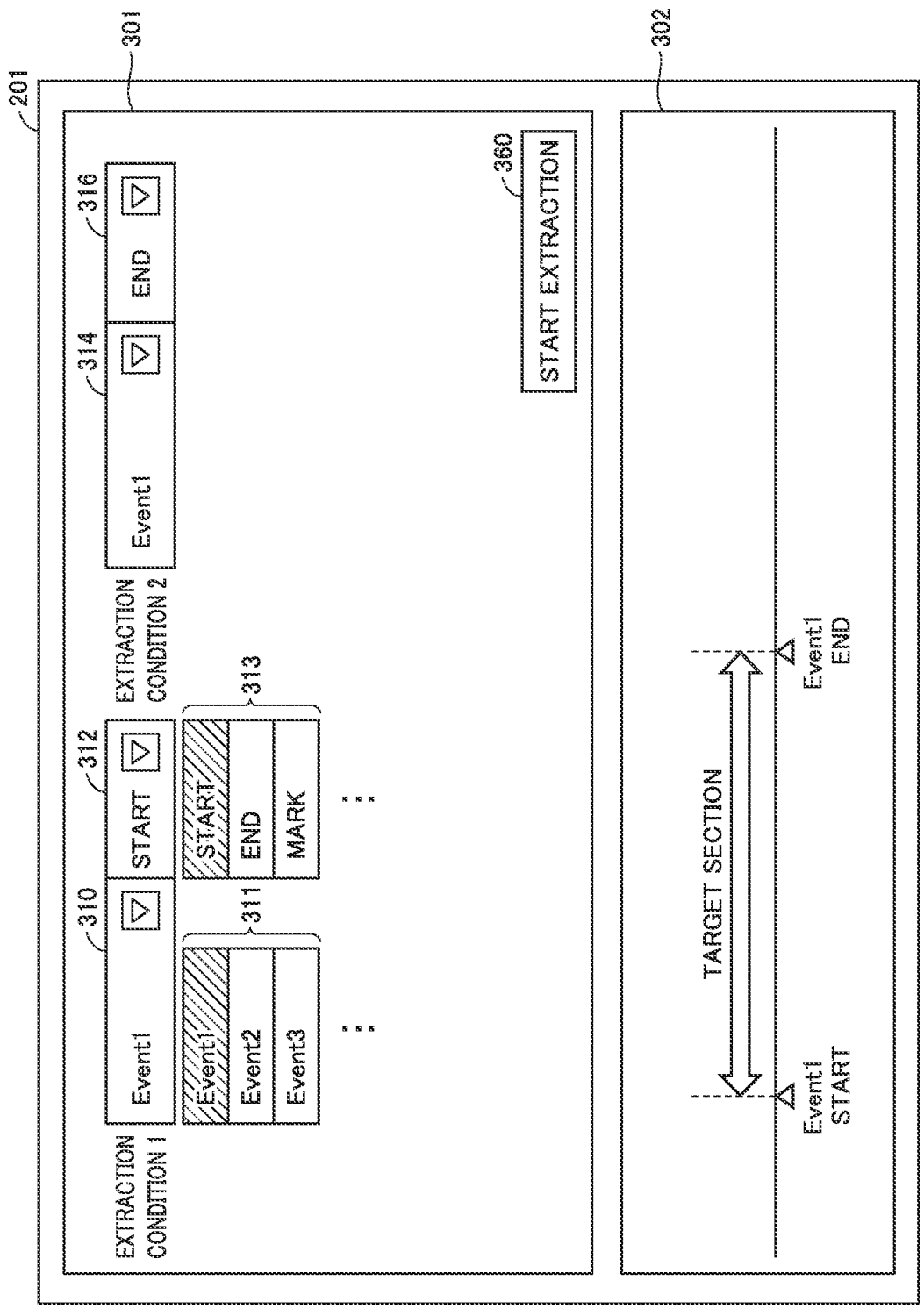
FIG. 9 is a diagram illustrating a first example of setting of an extraction condition.

FIG. 9 is a diagram illustrating a first example of setting of an extraction condition. Referring to FIG. 9, display 201 of support apparatus 200 shows a condition setting image 301 and a target section image 302. Condition setting image 301 is an image for setting two conditions (the first condition to the second condition). Each condition includes an item (for example, a first condition name item 310) for entry of a condition name and an item (for example, a first type item 312) for entry of a type. A value of the item for entry of the condition name corresponds to a value registered in identifier 402 in chapter 40 when process value 50 satisfies the conditional expression in the event condition. The item for entry of the type corresponds to a value registered in information type 403 in chapter 40 when process value 50 satisfies the conditional expression in the event condition. Condition setting image 301 includes an extraction start button 360 for starting extraction of process value 50 in accordance with the set extraction condition.

Support apparatus 200 accepts setting of the extraction condition in response to an operation by a user with the use of operation input portion 202. When extraction start button 360 is pressed by an operation by the user with the use of operation input portion 202 after acceptance of setting, processor 102 executes extraction program 155. Processor 102 specifies a target section for extracting process value 50 stored in time-series database 20, based on setting contents in the extraction condition.

Exemplary setting of an extraction condition will be described with reference to FIG. 9. In first condition name item 310 in the first extraction condition, for example, the value "Event1" among a plurality of values shown in a condition name selection field 311 is entered. "Event1" corresponds, for example, to work process 1. In first type item 312, the value "start" among a plurality of values shown in a type selection field 313 is entered. Then, in a second condition name item 314 in the second extraction condition, the value "Event1" is entered. In a second type item 316, the value "end" is entered.

When extraction start button 360 is pressed by an operation by the user after the first extraction condition and the second extraction condition are set, processor 102 executes extraction program 155 and specifies a target section of extraction. More specifically, processor 102 specifies a section between process value 50 that satisfies a condition for starting Event1 and a process value that satisfies a condition for quitting Event1.

As the first extraction condition and the second extraction condition are set, target section image 302 is shown. Target section image 302 includes an image showing a target section of extraction between process value 50 including time information corresponding to chapter 40 including the value indicating start of Event1 and process value 50 including time information corresponding to chapter 40 including the value indicating end of Event1. With increase in number of process values 50 included in the target section, the target section has a longer length, and with decrease in number of process values, the target section has a shorter length. Process value 50 including time information corresponding to chapter 40 includes, for example, time information the same as chapter 40. Control device 10 thus specifies the target section based on a combination of a plurality of chapters including chapter 40 included in the first extraction condition and chapter 40 included in the second extraction condition. Control device 10 can thus accept the extraction condition under which data that allows efficient subsequent analysis by a user can be extracted.

Figure 10:
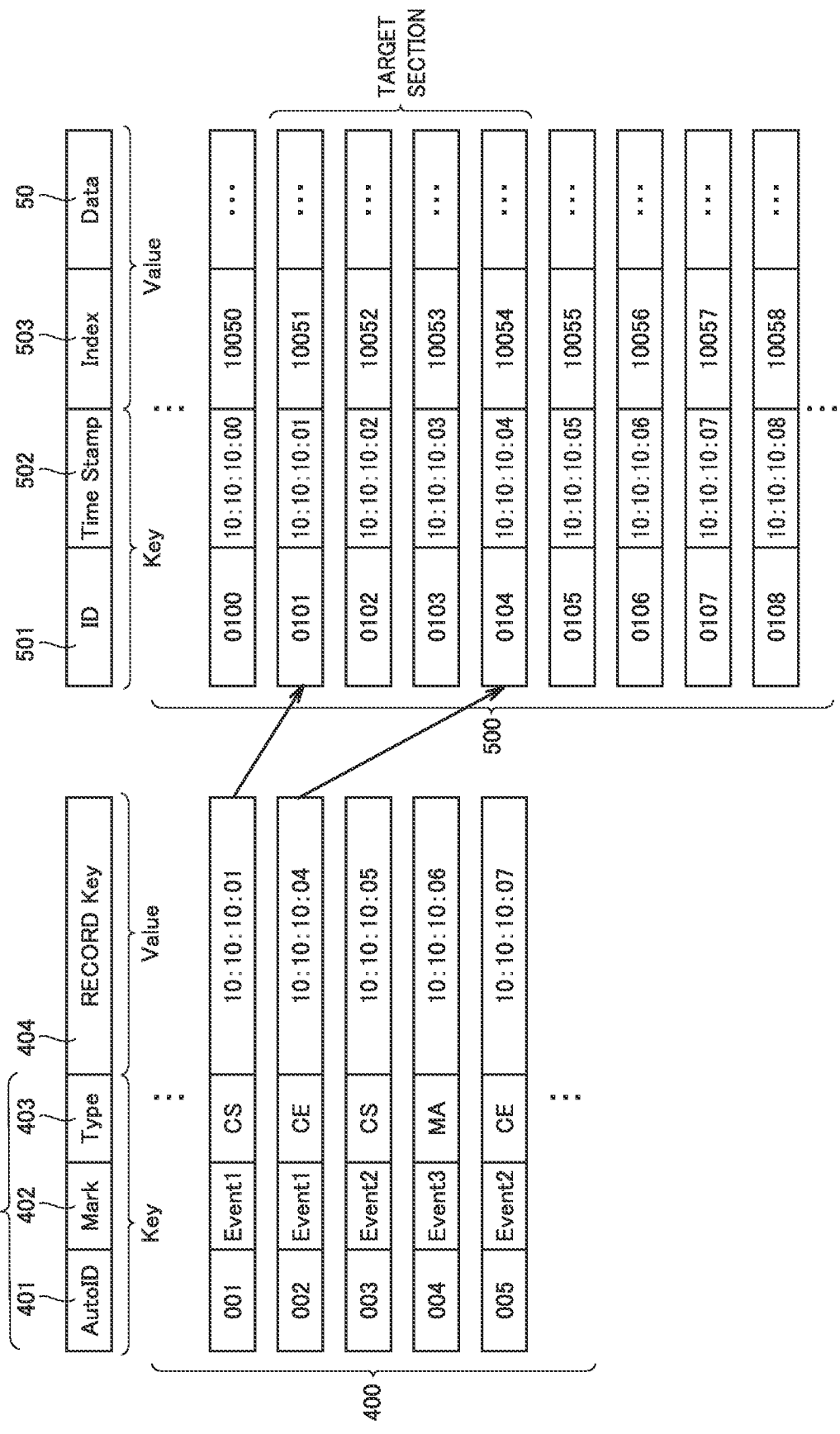
FIG. 10 is a diagram showing exemplary extraction of time-series data of process values based on a first extraction condition and a second extraction condition.

FIG. 10 is a diagram showing exemplary extraction of time-series data of process values 50 based on the first extraction condition and the second extraction condition. A plurality of chapters 40 included in chapter database 400 and a plurality of process values 50 included in process value database 500 shown in FIG. 10 are the same in content as description with reference to FIG. 8.

Referring to FIG. 10, processor 102 executes extraction program 155. More specifically, processor 102 designates one or more chapters 40. Processor 102 designates chapter 40, for example, under two extraction conditions of the first extraction condition and the second extraction condition described with reference to FIG. 9. Processor 102 designates chapter 40 that satisfies the first extraction condition. The first extraction condition includes a set value "Event1" in first condition name item 310 and a set value "start" in first type item 312. Processor 102 designates chapter 40, for example, including AutoID 401 having the value "001" as chapter 40 that satisfies the first extraction condition. Chapter 40 including AutoID 401 having the value "001" includes "Event1" in identifier 402 and "CS" in information type 403.

Processor 102 designates chapter 40 that satisfies the second extraction condition. The second extraction condition includes the set value "Event1" in second condition name item 314 and the set value "end" in second type item 316. Processor 102 designates chapter 40, for example, including AutoID 401 having the value "002" as chapter 40 that satisfies the second extraction condition. Chapter 40 including AutoID 401 having the value "002" includes "Event1" in identifier 402 and "CE" in information type 403.

Then, processor 102 determines a target section including a start position and an end position with time information in correspondence with two designated chapters 40 being defined as the reference. More specifically, processor 102 specifies process value 50 including time information (the value of time stamp 502) the same as chapter 40, with the value of record Key 404 "10:10:10:01" of chapter 40 including AutoID 401 having the value "001" being defined as the reference. Processor 102 specifies process value 50 including time information (the value of time stamp 502) the same as chapter 40, with the value of record Key 404 "10:10:10:04" of chapter 40 including AutoID 401 having the value "004" being defined as the reference. Processor 102 determines a section from process value 50 including ID 501 having the value "0101" to process value 50 including ID 501 having the value "0104" (a section where ID 501 has values from "0101" to "0104") as the target section of extraction. By accepting a plurality of extraction conditions, control device 10 can thus set the process value based on a detailed extraction condition and extract the process value based on the extraction condition.

[H. Setting of Extraction Condition (Start to End Including Offset)]

Another example of setting of an extraction condition will now be described.

Figure 11:
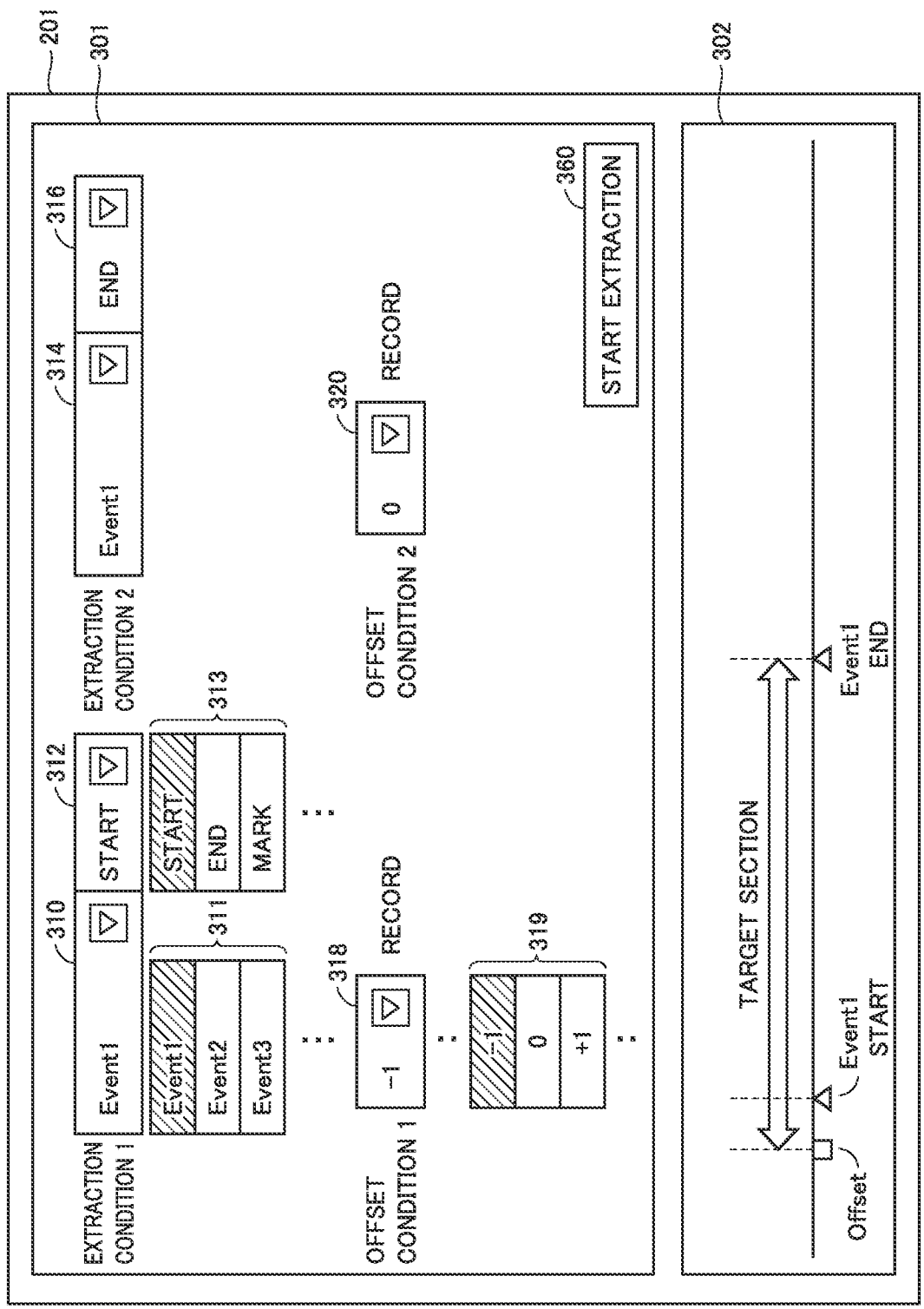
FIG. 11 is a diagram illustrating a second example of setting of an extraction condition.

FIG. 11 is a diagram illustrating a second example of setting of an extraction condition. Referring to FIG. 11, display 201 of support apparatus 200 shows condition setting image 301 and target section image 302. Condition setting image 301 and target section image 302 in FIG. 11 are partially identical in configuration to those described with reference to FIG. 9 and otherwise different. A different configuration will be described below.

Condition setting image 301 is an image for setting an offset condition in addition to the two conditions (the first extraction condition and the second extraction condition) described with reference to FIG. 9.

A first offset item 318 in a first offset condition represents the number of records to be offset from process value 50 including time information corresponding to chapter 40 including the value indicating start. A second offset item 320 in a second offset condition represents the number of records offset from process value 50 including time information corresponding to chapter 40 including the value indicating end.

In first condition name item 310 in the first extraction condition in FIG. 11, "−1" among a plurality of values shown in an offset selection field 319 for first offset item 318 is entered. Then, "0" is entered into second offset item 320.

The first extraction condition, the second extraction condition, the first offset condition, and the second offset condition are thus set. Thereafter, when extraction start button 360 is pressed by an operation by the user, processor 102 executes extraction program 155 to determine a target section of extraction. More specifically, processor 102 determines as the target section, a section between process value 50 offset by one record from process value 50 that satisfies the condition for starting Event1 and a process value that satisfies a condition for quitting Event1. Processor 102 thus designates a range for specifying the start position and/or the end position of the target section with time information in correspondence with one or more chapters being defined as the reference.

As the first extraction condition, the second extraction condition, the first offset condition, and the second offset condition are set, target section image 302 is shown. Target section image 302 includes an image showing a target section of extraction. The image is an image of process value 50 offset by −1 record from process value 50 including time information corresponding to chapter 40 including the value indicating start of Event1. The image is an image between the former and process value 50 including time information corresponding to chapter 40 including the value indicating end of Event1. Process value 50 is offset by −1 record from process value 50 including time information corresponding to chapter 40 including the value indicating start. Therefore, the target section in target section image 302 in FIG. 11 is longer than the target section in target section image 302 in FIG. 9.

Figure 12:
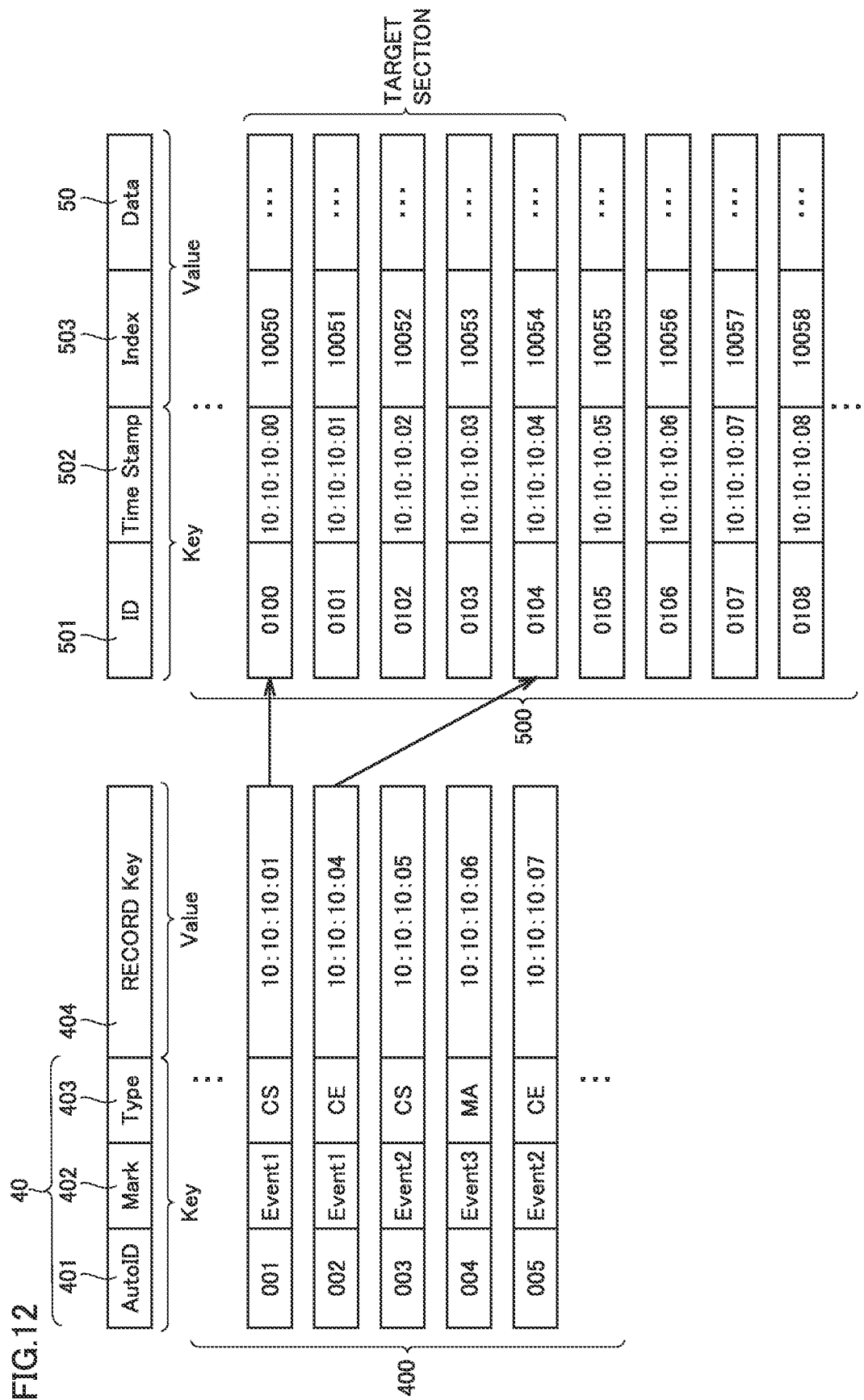
FIG. 12 is a diagram showing exemplary extraction of time-series data of process values based on a first offset condition and a second offset condition.

FIG. 12 is a diagram showing exemplary extraction of time-series data of process values 50 based on the first offset condition and the second offset condition. Contents of extraction of process value 50 with the time information in correspondence with chapter 40 being defined as the reference in FIG. 12 are identical to the contents described with reference to FIG. 10 and partially different therefrom. Different contents will be described below.

Referring to FIG. 12, processor 102 designates a range for specifying the start position and the end position with time information in correspondence with designated chapter 40 being defined as the reference. In FIG. 10 described previously, a range where process value 50 including ID 501 having the value "0101" is defined as the start position and process value 50 including ID 501 having the value "0104" is defined as the end position (the range where ID 501 has values from "0101" to "0104") is set as a target range of extraction.

In contrast, processor 102 specifies process value 50 including ID 501 having the value "0100" and including time stamp 502 having the value "10:10:10:00" as the start position. Process value 50 including ID 501 having the value "0100" is a process value offset by −1 record from process value 50 including ID 501 having the value "0101".

Processor 102 specifies process value 50 including ID 501 having the value "0104" and including time stamp 502 having the value "10:10:10:04" as the end position. Consequently, processor 102 determines a range where ID 501 has values from "0100" to "0104" as the target section of extraction. Control device 10 can thus accept change of at least any of the start position and/or the end position of the target section in the extraction condition.

[I. Setting of Extraction Condition (Start to End in Work Process 1 and Work Process 2)]

Another example of setting of an extraction condition will now be described.

Figure 13:
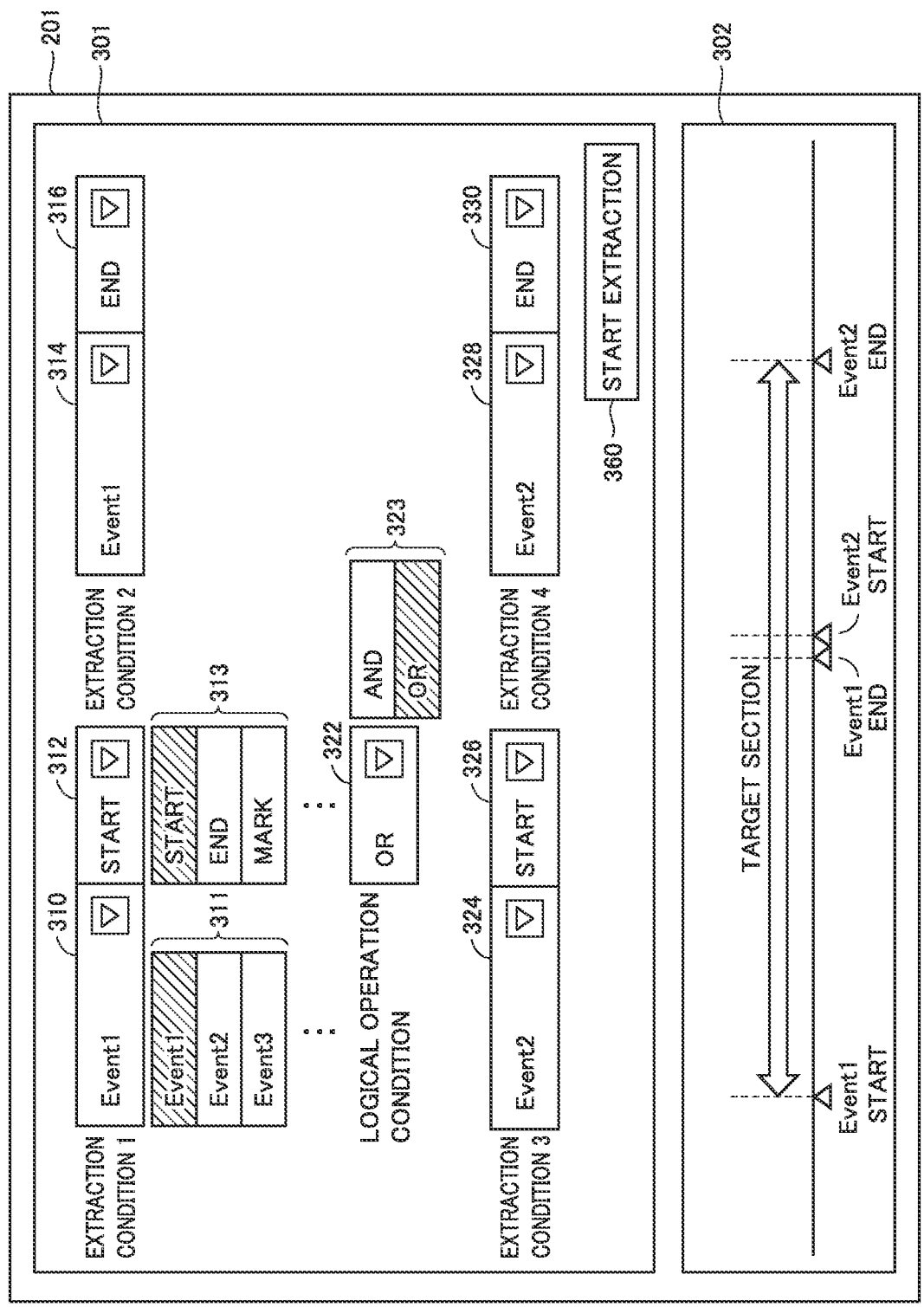
FIG. 13 is a diagram illustrating a third example of setting of an extraction condition.

FIG. 13 is a diagram illustrating a third example of setting of an extraction condition. Referring to FIG. 13, display 201 of support apparatus 200 shows condition setting image 301 and target section image 302. Condition setting image 301 and target section image 302 in FIG. 13 are partially identical in configuration to those described with reference to FIG. 9 and otherwise different. A different configuration will be described below.

Condition setting image 301 is an image for setting third and fourth extraction conditions and logical operation, in addition to the two conditions (the first extraction condition and the second extraction condition) described with reference to FIG. 9.

Referring to FIG. 13, in a third condition name item 324 in the third extraction condition, the value "Event2" is entered. "Event2" corresponds, for example, to a work process 2. The value "start" is entered in a third type item 326. Then, in a fourth condition name item 328 in the fourth extraction condition, the value "Event2" is entered In a fourth type item 330, the value "end" is entered. In an operation setting item 322 in a logical operation condition, a value "OR" representing logical sum of a plurality of values shown in an operation selection field 323 is entered.

The first to fourth extraction conditions and the logical operation condition are thus set. When extraction start button 360 is pressed by an operation by the user with the use of operation input portion 202 after setting is made, processor 102 executes extraction program 155. Processor 102 determines a target section for extracting process value 50 based on contents of setting of the extraction condition. More specifically, processor 102 specifies a section between process value 50 including time information corresponding to chapter 40 satisfying the condition for starting Event1 and a process value including time information corresponding to chapter 40 satisfying the condition for quitting Event1. Processor 102 specifies a section between process value 50 including time information corresponding to chapter 40 satisfying the condition for starting Event2 and process value 50 including time information corresponding to chapter 40 satisfying the condition for quitting Event2. Processor 102 determines a section defined by logical sum between the two extraction conditions as the target section.

The extraction condition is thus defined by logical operation between a plurality of extraction conditions that determine the target section. Each of the plurality of extraction conditions determines a target section. Each of the plurality of extraction conditions is also referred to as a "unit extraction condition" below. A section determined by the unit extraction condition is also referred to as a "unit section" below.

As the first to fourth extraction conditions are set, target section image 302 is shown. Target section image 302 includes an image showing a target section of extraction between process value 50 including time information corresponding to chapter 40 including the value indicating start of Event1 and process value 50 including time information corresponding to chapter 40 including the value indicating end of Event2. Control device 10 thus determines the target section based on a combination of a plurality of chapters included in each of the first to fourth extraction conditions. By accepting the plurality of extraction conditions, control device 10 can set process value 50 based on a detailed extraction condition and can extract the process value based on the extraction condition. Furthermore, as the extraction condition can be set by using logical operation, control device 10 can arbitrarily set the range of extraction of process value 50 based on a combination of a plurality of conditions.

Figure 14:
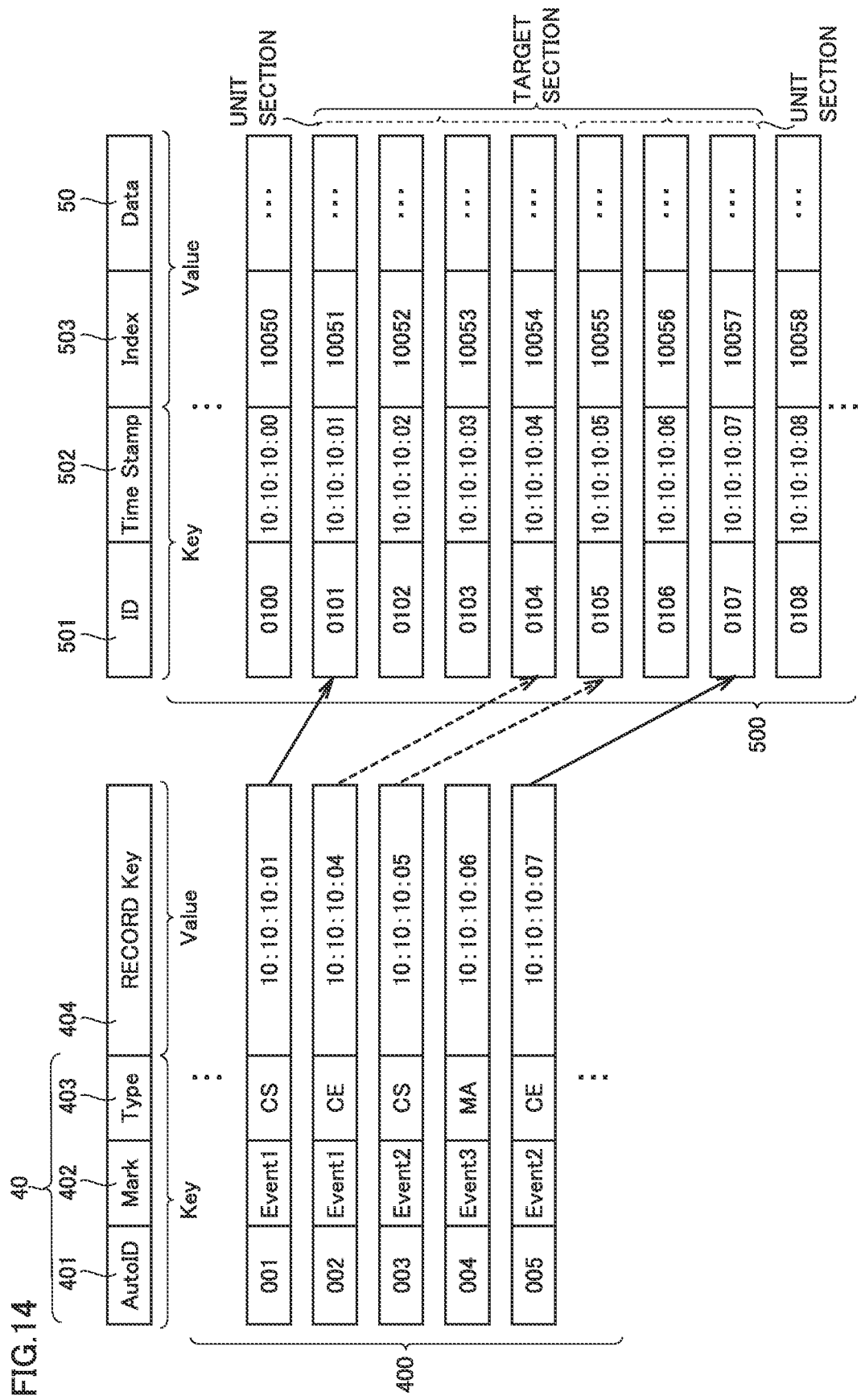
FIG. 14 is a diagram showing exemplary extraction of time-series data of process values based on first to fourth extraction conditions.

FIG. 14 is a diagram showing exemplary extraction of time-series data of process values 50 based on the first to fourth extraction conditions. Contents of extraction of process value 50 with the time information in correspondence with chapter 40 being defined as the reference in FIG. 14 are identical to the contents described with reference to FIG. 10 and partially different therefrom. Different contents will be described below.

Referring to FIG. 14, processor 102 designates a range for specifying the start position and the end position with time information in correspondence with designated chapter 40 being defined as the reference. In FIG. 10, a range where process value 50 including ID 501 having the value "0101" is defined as the start position and process value 50 including ID 501 having the value "0104" is defined as the end position (a range where ID 501 has values from "0101" to "0104") is set as the target range of extraction.

In contrast, processor 102 determines a target section based on an extraction condition including a plurality of unit extraction conditions and extracts process value 50 included in the target section. A unit section is determined based on each condition of the plurality of unit extraction conditions. The extraction condition is a condition defined by logical operation (for example, logical sum).

More specifically, processor 102 specifies process value 50 including ID 501 having the value "0101" and including time stamp 502 having the value "10:10:10:01" as the start position in accordance with the extraction condition. Processor 102 specifies process value 50 including ID 501 having the value "0104" and including time stamp 502 having a value "10:10:10:07" as the end position. Processor 102 specifies process values 50 including ID 501 having values from "0101" to "0104" as process values 50 in a section (unit section) included in the target section. Processor 102 determines process values 50 including ID 501 having values from "0105" to "0107" as process values 50 of a section (unit section) included in the target section.

Consequently, processor 102 determines as the target section of extraction, a range where process value 50 including ID 501 having the value "0101" is defined as the start position and process value 50 including ID 501 having the value "0107" is defined as the end position (a range where ID 501 has values from "0101" to "0107"). As a plurality of combinations of a plurality of extraction conditions can thus be set, control device 10 can thus more readily extract data intended by a user.

Though processor 102 specifies a target section through processing using logical sum for determining a target section described above, it may specify a target section of extraction through processing using logical AND.

[J. Setting of Extraction Condition (Threshold Value)]
Another example of setting of an extraction condition will now be described.

Figure 15:
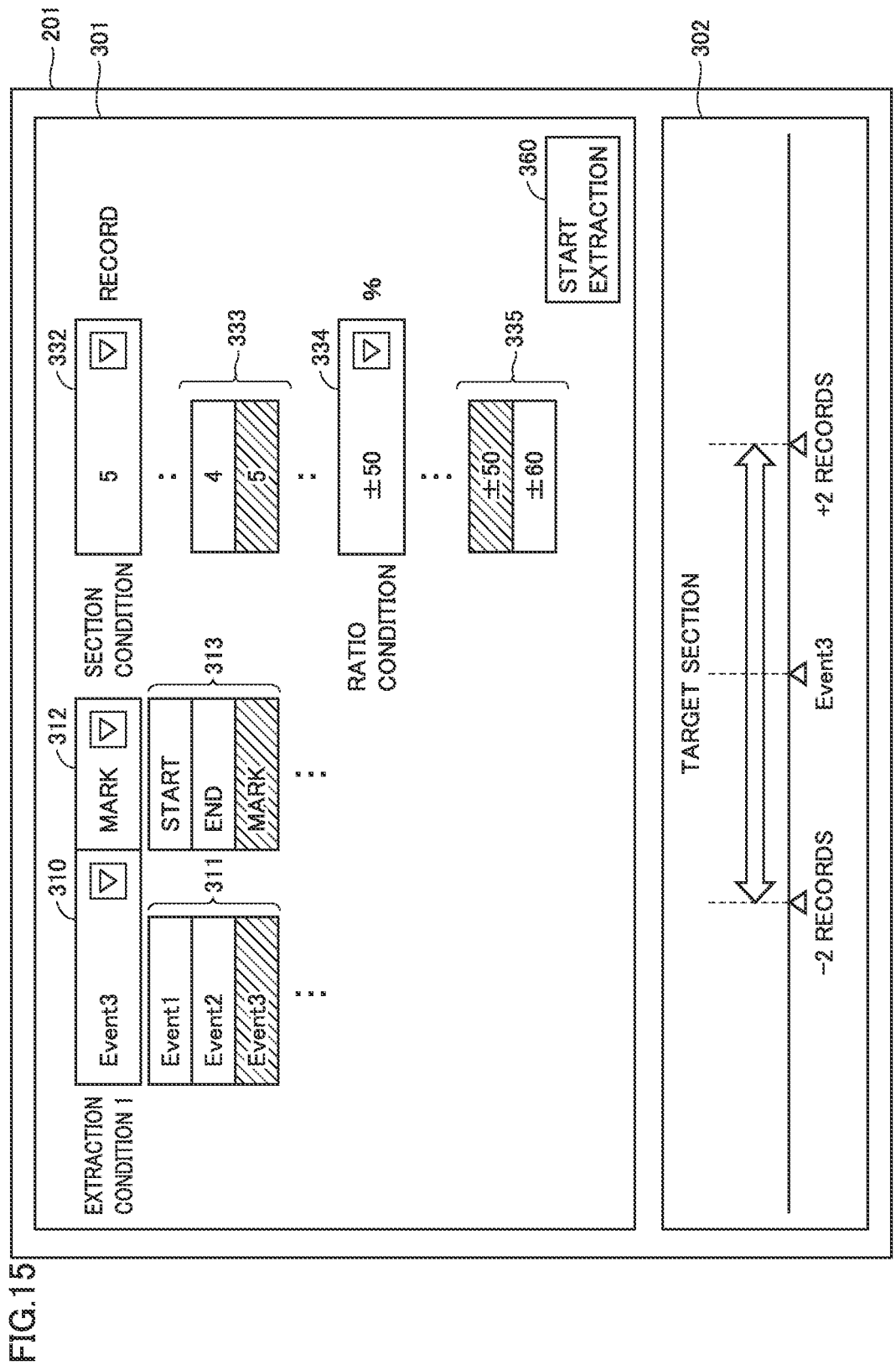
FIG. 15 is a diagram illustrating a fourth example of setting of an extraction condition.

FIG. 15 is a diagram illustrating a fourth example of setting of an extraction condition. Referring to FIG. 15, display 201 of support apparatus 200 shows condition setting image 301 and target section image 302. Condition setting image 301 and target section image 302 in FIG. 15 are partially identical in configuration to those described with reference to FIG. 9 and otherwise different. A different configuration will be described below.

Condition setting image 301 is an image for setting one condition (for example, the first extraction condition) of the two conditions (the first extraction condition and the second extraction condition) described with reference to FIG. 9. Furthermore, condition setting image 301 is an image for setting a section condition and a ratio condition. In first condition name item 310 in the first extraction condition in FIG. 15, "Event3" among a plurality of values shown in condition name selection field 311 is selected. "Event3" corresponds, for example, to a work process 3. In first type item 312, "mark" among a plurality of values shown in type selection field 313 is selected. "Mark" refers, for example, to a value for searching for chapter 40 including information type 403 indicating that a workpiece satisfies a condition not lower than a predetermined temperature (for example, equal to or higher than 500° C.).

A section item 332 in the section condition is an item for entry of a value indicating the number of records in a target section including process value 50 that satisfies the condition for the mark. A ratio item 334 in the ratio condition is an item for entry of a value that specifies a position within a target section of process value 50 that satisfies the condition for the mark. For example, when a value entered in section item 332 is "5" and a value entered in ratio item 334 is "±50%", a position of the process value that satisfies the condition for the mark is a position of a record in the center. The record in the center is the third record of five records. In other words, process value 50 that satisfies the condition for the mark and process values 50 within a range of ± two records from this process value 50 are included in the target section of extraction.

In section item 332 in the section condition shown in FIG. 15, "5" among a plurality of values shown in a section selection field 333 is entered. In ratio item 334 in the ratio condition, "±50" among a plurality of values shown in a ratio selection field 335 is entered.

The first extraction condition, the section condition, and the ratio condition are thus set. Thereafter, as extraction start button 360 is pressed by an operation by the user, processor 102 executes extraction program 155 to specify a target section of extraction. More specifically, processor 102 determines as the target section, a section between process value 50 corresponding to a minus number of record and process value 50 corresponding to a plus number of record, with process value 50 including time information corresponding to chapter 40 satisfying the condition for the mark for Event3 being defined as the reference. Process value 50 corresponding to a minus number of record is, for example, process values 50 within a range of minus two records from process value 50 that satisfies the condition for the mark. Process value 50 corresponding to the minus number of record is, for example, process values 50 within a range of plus two records from process value 50 that satisfies the condition for the mark.

As the first extraction condition, the section condition, and the ratio condition are set, target section image 302 is shown. Target section image 302 includes an image in which a section including process value 50 that satisfies the condition for the mark and process values 50 within a range set by section item 332 and ratio item 334 with process value 50 being defined as the reference is defined as the target section. More specifically, target section image 302 includes an image in which a section between process value 50 corresponding to minus two records from process value 50 that satisfies the condition for the mark and process value 50 corresponding to plus two records from process value 50 that satisfies the condition for the mark is defined as the target section of extraction.

Figure 16:
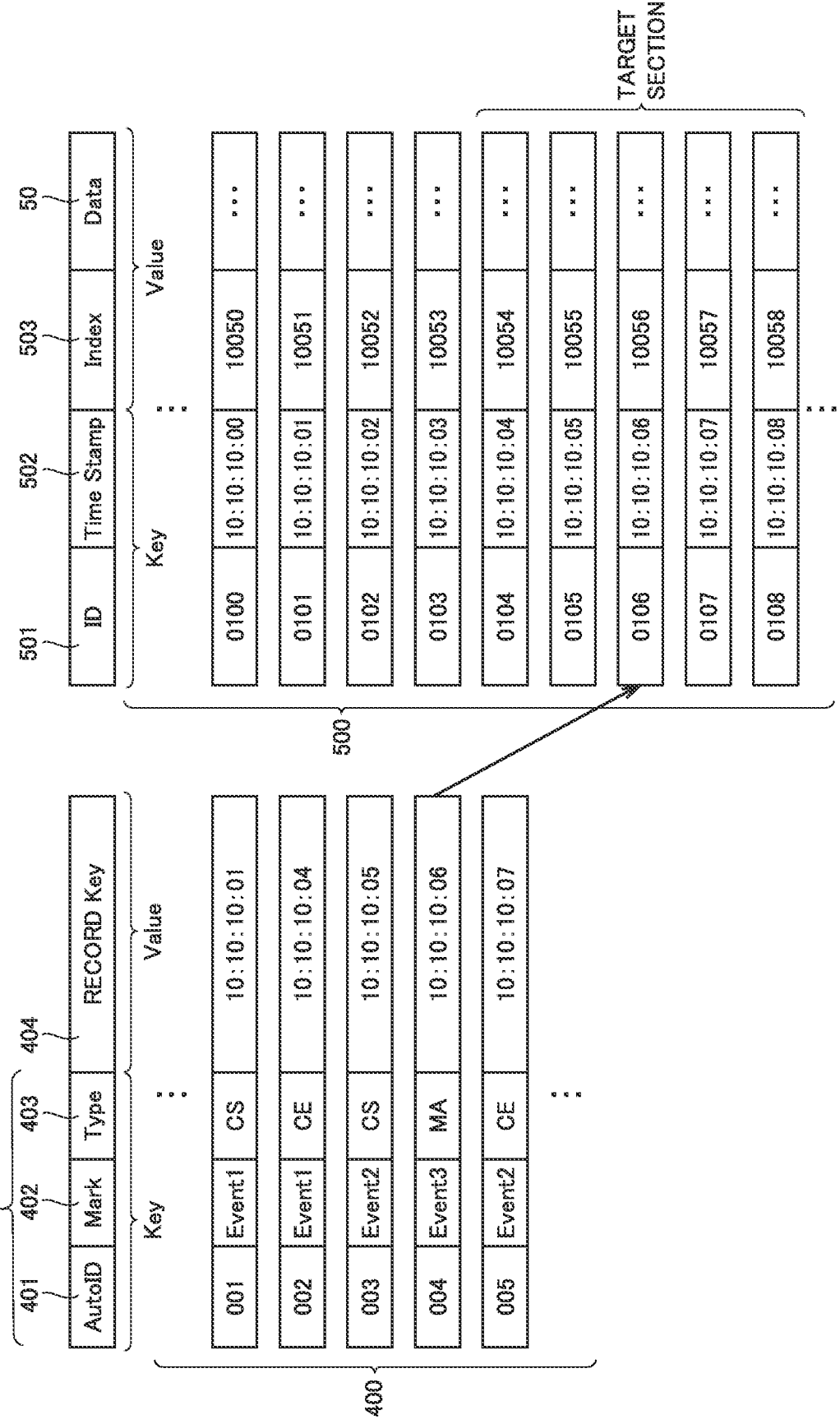
FIG. 16 is a diagram showing exemplary extraction of time-series data of process values based on the first extraction condition, a section condition, and a ratio condition.

FIG. 16 is a diagram showing exemplary extraction of time-series data of process values 50 based on the first extraction condition, the section condition, and the ratio condition. Referring to FIG. 16, processor 102 specifies process value 50 that satisfies the condition for the mark with time information in correspondence with designated chapter 40 being defined as the reference, and designates a range for extraction including specified process value 50. Processor 102 determines a target section with time information "10:10:10:06" in correspondence with chapter 40 including identifier 402 set to "Event3" and information type 403 set to "MA" being defined as the reference. More specifically, processor 102 specifies process value 50 including ID 501 having a value "0106" and including time stamp 502 having a value "10:10:10:06". Processor 102 specifies process values 50 including ID 501 having values "0104" and "0105" within a range of +2 records from process value 50 including ID 501 having the value "0106". Processor 102 specifies process values 50 including ID 501 having values "0107" and "0108" within a range of +2 records from process value 50 including ID 501 having the value "0106". Processor 102 thus determines a section of process values 50 including ID 501 having values from "0104" to "0108" as the target section. Then, the processor extracts the time-series database including process values 50 including ID 501 having the values from "0104" to "0108". Control device 10 can thus readily set a target range for efficient subsequent analysis based on a threshold value.

[K. Procedure of Processing in Image Processing Apparatus]

Figure 17:
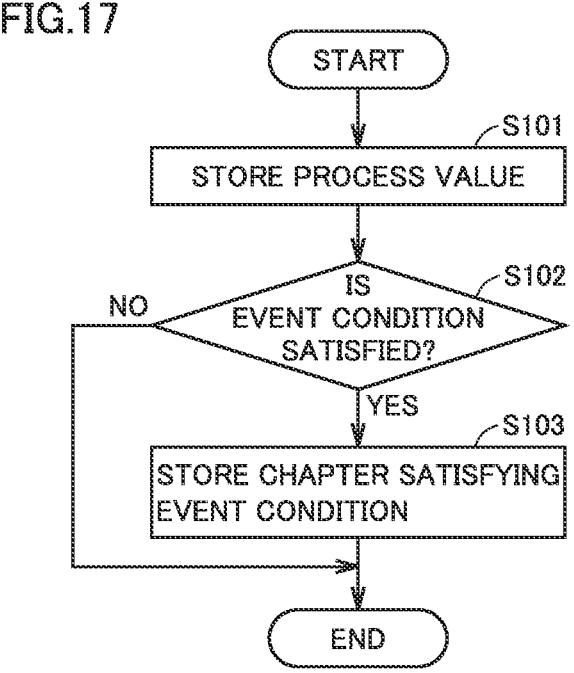
FIG. 17 is a flowchart illustrating processing for storing a chapter in the time-series database.
Figure 18:
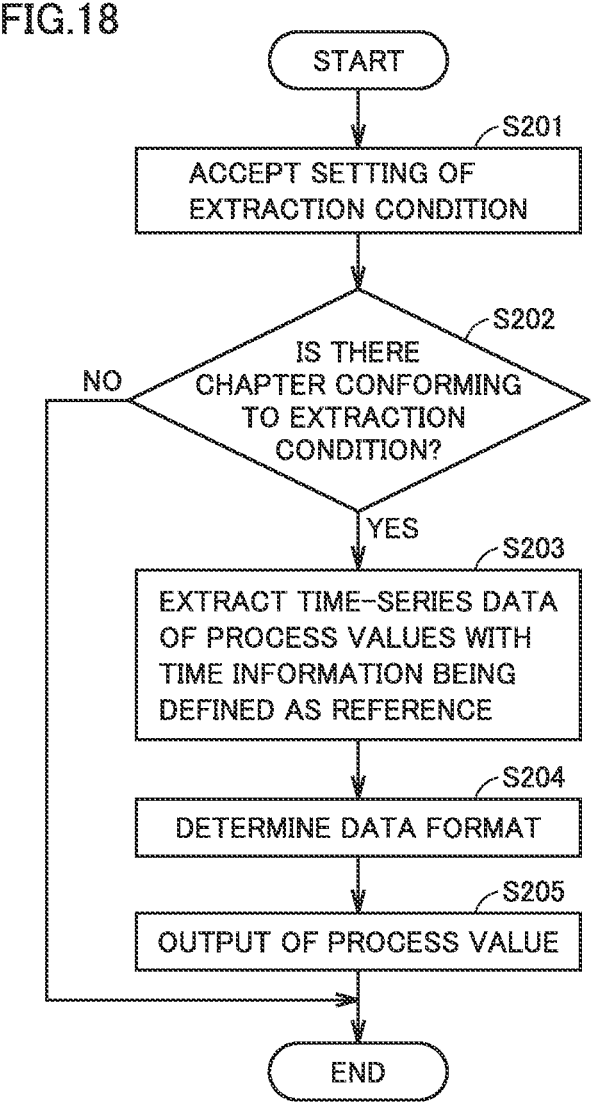
FIG. 18 is a flowchart illustrating processing for extracting a process value based on an extraction condition.

A procedure of processing by processor 102 in control device 10 will be described with reference to FIGS. 17 and 18. Control in FIG. 17 is implemented by execution of collection program 153 and condition monitoring program 154 by processor 102. Control in FIG. 18 is implemented by execution of extraction program 155 and higher-order connection program 192 or gateway program 194 by processor 102.

FIG. 17 is a flowchart illustrating processing for storing chapter 40 in time-series database 20. In step S101, processor 102 causes process value 50 to be stored in time-series database 20 every control cycle. Process value 50 is stored in time-series database 20 in a time-series manner.

In step S102, processor 102 determines whether or not there is chapter 40 satisfying the event condition. When there is chapter 40 satisfying the event condition (YES in step S102), processor 102 switches control to step S103. Otherwise (NO in step S102), processor 102 quits the process in the present flowchart.

In step S103, processor 102 causes chapter 40 satisfying the event condition to be stored in time-series database 20 in correspondence with time information that specifies the control cycle of control device 10.

FIG. 18 is a flowchart illustrating processing for extracting process value 50 based on an extraction condition. In step S201, processor 102 accepts setting of the extraction condition and executes extraction program 155.

In step S202, processor 102 determines whether or not there is chapter 40 satisfying the extraction condition. When there is chapter 40 satisfying the extraction condition (YES in step S202), processor 102 switches control to step S203. Otherwise (NO in step S202), processor 102 quits the process in the present flowchart.

In step S203, processor 102 determines a target section with time information in correspondence with chapter 40 being defined as the reference, and extracts time-series data of process value 50 included in the determined target section from time-series database 20.

In step S204, processor 102 determines a data format for output of extracted process value 50 to an external apparatus. Processor 102 determines a data format for output, for example, from formats including CSV, SQL, and the binary format.

In step S205, processor 102 provides data including process value 50 expressed in the determined data format. Control device 10 can thus readily extract data for efficient subsequent analysis, by extracting time-series data of process values 50 in accordance with the extraction condition.

[L. Modification]

In the present embodiment, time-series database 20 is described as being typically arranged in main storage 106 or secondary storage 108. In contrast, time-series database 20 may be arranged in memory card 116. More specifically, time-series database 20 may be arranged only in memory card 116 or in memory card 116 and main storage 106 or secondary storage 108. Time-series database 20 arranged in main storage 106 or secondary storage 108 may be output to memory card 116 through memory card interface 114.

In the present embodiment, extraction program 155 is described as being executed in control device 10. In contrast, extraction program 155 may be provided and executed in PLC engine 150.

Extraction program 155 does not have to be executed at timing based on the control cycle of control device 10 and may be executed at any timing. Therefore, extraction program 155 may be provided and executed in another apparatus that can access time-series database 20 in control device 10. Extraction program 155 may be provided and executed, for example, in another apparatus including support apparatus 200. Another apparatus in which extraction program 155 is provided executes extraction program 155. Another apparatus transmits an instruction to extract process value 50 in a target section in accordance with an extraction condition to control device 10. Control device 10 that accepts the instruction for extraction may extract process value 50 in the target section in accordance with the extraction condition and provide process value 50 in any data format. Processing for transmitting an instruction to extract process value 50 in the target section and processing for extracting process value 50 in the target section may thus be performed by separate apparatuses.

In the present embodiment, the extraction condition is described as being defined by logical operation between two unit extraction conditions. In contrast, the extraction condition may be defined by logical operation among at least three unit extraction conditions. Alternatively, the extraction condition may be defined only based on a single unit extraction condition.

In the present embodiment, processor 102 is described as bringing a value of record Key 404 in chapter 40 and a value of time stamp 502 in process value 50 in correspondence with each other as time information. In contrast, another value may be brought in correspondence as time information. More specifically, index 503 may be adopted as time information in process value 50. In this case, a value of index 503 is set in correspondence with the value of record Key 404 in chapter 40, instead of a value of time stamp 502.

The present embodiment describes setting of the number of records as being accepted in first offset item 318 in the first offset condition and in second offset item 320 in the second offset condition. In contrast, setting of time in accordance with a length of the control cycle may be accepted in first offset item 318 and second offset item 320.

The present embodiment describes setting of the number of records as being accepted in section item 332 in the section condition. In contrast, setting of time in accordance with a length of the control cycle may be accepted in section item 332.

<Additional Aspects>

As set forth above, the present embodiment includes disclosure as below.

[Configuration 1]

A control device (10) comprising:
- a collecting module (22) configured to cause at least a subset of one or more process values (50) available in the control device (10) to be stored in a time-series manner every predetermined control cycle;
- a condition monitoring module (23) configured to determine, every control cycle, whether one or more predetermined event conditions are satisfied in relation to at least the subset of the one or more process values (50) and to cause, when any event condition is satisfied, a chapter (40) associated with the satisfied event condition to be stored in correspondence with time information that specifies the control cycle; and
- an extracting module (24) configured to determine, in accordance with an extraction condition defined to include at least one of one or more chapters (40), a target section with the time information in correspondence with the chapter (40) included in the extraction condition being defined as a reference, and to extract time-series data of the stored process values (50) included in the determined target section.

[Configuration 2]

The control device described in Configuration 1, wherein the extraction condition includes designation of one or more chapters (40) and designation of a range for specifying a start position and/or an end position of the target section with the time information in correspondence with the one or more chapters (40) being defined as the reference.

[Configuration 3]

The control device described in Configuration 1 or 2, wherein
the extraction condition includes a combination of a plurality of the chapters (40).

[Configuration 4]

The control device described in Configuration 3, wherein
the extraction condition includes a plurality of combinations of the plurality of chapters (40).

[Configuration 5]

The control device described in Configuration 1 or 2, wherein
the extraction condition is defined by logical operation between a plurality of extraction conditions on which determination of the target section is based.

[Configuration 6]

The control device described in any one of Configurations 1 to 5, wherein
a value of the chapter (40) associated with the event condition is set to any value by a user.

[Configuration 7]

The control device described in any one of Configurations 1 to 6, further comprising an output module (25) configured to provide output in any data format, of the time-series data of process values (50) extracted by the extracting module (24).

[Configuration 8]

A control program executed in a control device (10) configured to control an object to be controlled, the control program causing the control device (10) to perform:
- storing in a time-series manner, every predetermined control cycle, at least a subset of one or more process values (50) available in the control device (10) (S101);
- determining, every control cycle, whether one or more predetermined event conditions are satisfied in relation to at least the subset of the one or more process values (50) and storing, when any event condition is satisfied, a chapter (40) associated with the satisfied event condition in correspondence with time information that specifies the control cycle (S103); and
- determining, in accordance with an extraction condition defined to include at least one of one or more chapters (40), a target section with the time information in correspondence with the chapter (40) included in the extraction condition being defined as a reference, and extracting time-series data of the stored process values (50) included in the determined target section (S203).

[Configuration 9]

A control system comprising:
- a control device (10) configured to control an object to be controlled; and
- an extracting module (24) configured to extract time-series data of process values, wherein the control device (10) includes
- a collecting module (22) configured to cause at least a subset of one or more process values (50) available in the control device (10) to be stored in a time-series manner every predetermined control cycle, and
- a condition monitoring module (23) configured to determine, every control cycle, whether one or more predetermined event conditions are satisfied in relation to at least the subset of the one or more process values (50) and to cause, when any event condition is satisfied, a chapter (40) associated with the satisfied event condition to be stored in correspondence with time information that specifies the control cycle, and the extracting module (24) is configured to determine, in accordance with an extraction condition defined to include at least one of one or more chapters (40), a target section with the time information in correspondence with the chapter (40) included in the extraction condition being defined as a reference, and to extract time-series data of the stored process values (50) included in the determined target section.

It should be understood that the embodiments disclosed herein are illustrative and non-restrictive in every respect. The scope of the present invention is defined by the terms of the claims rather than the description above and is intended to include any modifications within the scope and meaning equivalent to the terms of the claims.

REFERENCE SIGNS LIST 1 control system; 2 first field network; 4 second field network; 6 higher-order network; 8 field apparatus group; 14 relay group; 16 servo driver; 17 servo motor; 18 image sensor; 19 camera; 20 time-series database; 21 variable manager; 22 collecting module; 23 condition monitoring module; 24 extracting module; 25 output unit; 40 chapter; 41 first chapter; 42 second chapter; 43 third chapter; 50 process value; 51 first process value; 52 second process value; 53 third process value; 54 fourth process value; 100 control device; 102 processor; 104 chip set; 106 main storage; 108 secondary storage; 110 higher-order network controller; 112 USB controller; 114 memory card interface; 116 memory card; 118, 120 field bus controller; 122 internal bus controller; 125 timer; 150 PLC engine; 151 control program; 152 user program; 153 collection program; 154 condition monitoring program; 155 extraction program; 160 variable management program; 162 system variable; 164 device variable; 166 user variable; 170 scheduler program; 172 input program; 174 output program; 192 higher-order connection program; 194 gateway program; 200 support apparatus; 201 display; 202 operation input portion; 209 event condition setting image; 210 first condition name; 212 first conditional expression; 214 first type; 215, 313 type selection field; 220 second condition name; 222 second conditional expression; 224 second type; 230 third condition name; 232 third conditional expression; 234 third type; 240 fourth condition name; 242 fourth conditional expression; 244 fourth type; 250 fifth condition name; 252 fifth conditional expression; 254 fifth type; 300 display apparatus; 301 condition setting image; 302 target section image; 310 first condition name item; 311 condition name selection field; 312 first type item; 314 second condition name item; 316 second type item; 318 first offset item; 319 offset selection field; 320 second offset item; 322 operation setting item; 323 operation selection field; 324 third condition name item; 326 third type item; 328 fourth condition name item; 330 fourth type item; 332 section item; 333 section selection field; 334 ratio item; 335 ratio selection field; 360 extraction start button; 400 chapter database; 402 identifier; 403 information type; 500 process value database; 502 time stamp; 503 index; 600 manufacturing execution system; 650 cloud service

The invention claimed is:

1. A control device comprising:
a controller communicatively connected to a field apparatus group over a network;
a timer that generates time information;
a memory storing computer code; and
at least one processor configured to access the memory to execute the computer code to at least:
receive a plurality of field values from the field apparatus group over the network and store one or more process values including a field value associated with the time information generated by the timer in a time-series database;
determine, every control cycle, whether an event associated with a work process of the field apparatus group occurs and in response to the event occurring, store a chapter associated with the event with time information generated by the timer that specifies the control cycle in the time-series database, the chapter comprising a character string specifying the chapter and a type of the event; and
determine a target section of the one or more process values based on the time information corresponding to a plurality of chapters that satisfy a plurality of extraction conditions, respectively; and
extract, from the time-series database, time-series data of the stored process values corresponding to the determined target section,
wherein each of the plurality of extraction conditions comprises a character string specifying a chapter and one of the plurality of types, and a number of records to be offset, and
the target selection includes at least one process value that is offset according to the number of records to be offset.

2. The control device according to claim 1, wherein
the plurality of extraction conditions include one or more chapters and a range from a start position to an end position of the target selection with the time information in correspondence with the one or more chapters as a reference.

3. The control device according to claim 2, wherein
the plurality of extraction conditions include a plurality of the pair of extraction conditions.

4. The control device according to claim 3, wherein
the plurality of extraction conditions include a logical operation condition between the plurality of the pair of extraction conditions.

5. The control device according to claim 1, wherein
the character string specifying the chapter is set by a user.

6. The control device according to claim 1, at least one processor is further configured to access the memory to execute the computer code to convert the extracted time-series data to a data format, and output the time-series data in the data format.

7. The control device according to claim 1, wherein the time-series database comprises a process value database and a chapter database,
wherein the process value database includes a plurality of first data structures corresponding to the process data, each first data structure including a key comprising an identifier and a time stamp, and a value comprising an index and one of the process values, and
wherein the chapter database includes a plurality of second data structures corresponding to the chapters, each second data structure including a key comprising an identifier, the character string, and the type of event, and a value comprising a key of a first data structure in the process value database.

8. A non-transitory storage computer-readable medium storing a control program thereon which, when executed by a control device causes the control device to:
receive a plurality of field values from a field apparatus group over a network and store one or more process values including a field value associated with time information generated by a timer in a time-series database;
determine, every control cycle, whether an event associated with a work process of the field apparatus group occurs and in response to the event occurring, store a chapter associated with the event with time information generated by the timer that specifies the control cycle in the time-series database, the chapter comprising a character string specifying the chapter and a type of the event; and
determine a target section of the one or more process values based on the time information corresponding to a plurality of chapters that satisfy a plurality of extraction conditions, respectively; and extract, from the time-series database, time-series data of the stored process values corresponding to the determined target section, wherein each of the plurality of extraction conditions comprises a character string specifying a chapter and one of the plurality of types, and a number of records to be offset, and the target selection includes at least one process value that is offset according to the number of records to be offset.

9. The non-transitory computer-readable storage medium according to claim 8, wherein the plurality of extraction conditions include a pair of the extraction conditions.

10. The non-transitory computer-readable storage medium according to claim 9, wherein the plurality of extraction condition includes a plurality of the pair of extraction conditions.

11. The non-transitory computer-readable storage medium according to claim 10, wherein the plurality of extraction conditions include a logical operation condition between the plurality of the pair of extraction conditions.

12. The non-transitory computer-readable storage medium according to claim 8, wherein the character string specifying the chapter is set by a user.

13. The non-transitory computer-readable storage medium according to claim 8, wherein the time-series database comprises a process value database and a chapter database, wherein the process value database includes a plurality of first data structures corresponding to the process data, each first data structure including a key comprising an identifier and a time stamp, and a value comprising an index and one of the process values, and wherein the chapter database includes a plurality of second data structures corresponding to the chapters, each second data structure including a key comprising an identifier, the character string, and the type of event, and a value comprising a key of a first data structure in the process value database.

\* \* \* \* \*